United States Patent
Jain et al.

(10) Patent No.: US 12,363,363 B2
(45) Date of Patent: Jul. 15, 2025

(54) SYSTEMS AND METHODS FOR ADAPTIVE ADJUSTMENT OF ADVERTISEMENT BOUNDARIES IN MEDIA

(71) Applicant: The Nielsen Company (US), LLC, New York, NY (US)

(72) Inventors: Anand Jain, Ellicott City, MD (US); Jose Mortensen, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 151 days.

(21) Appl. No.: 18/456,573

(22) Filed: Aug. 28, 2023

(65) Prior Publication Data

US 2024/0040173 A1    Feb. 1, 2024

Related U.S. Application Data

(60) Provisional application No. 63/392,338, filed on Jul. 26, 2022.

(51) Int. Cl.
*H04N 21/2668* (2011.01)
*H04N 21/24* (2011.01)
*H04N 21/81* (2011.01)

(52) U.S. Cl.
CPC ..... *H04N 21/2407* (2013.01); *H04N 21/2668* (2013.01); *H04N 21/812* (2013.01)

(58) Field of Classification Search
CPC .......... H04N 21/2407; H04N 21/2668; H04N 21/6582; H04N 21/812
See application file for complete search history.

(56) References Cited

U.S. PATENT DOCUMENTS

| | | |
|---|---|---|
| 8,925,024 B2 | 12/2014 | Wright et al. |
| 11,418,821 B1 | 8/2022 | Vartakavi et al. |
| 11,722,709 B2 | 8/2023 | Fahnestock et al. |
| 11,769,328 B2 | 9/2023 | Dimitriou et al. |
| 2022/0264178 A1 | 8/2022 | Garg et al. |
| 2022/0286737 A1 | 9/2022 | Hodges et al. |
| 2023/0328297 A1 | 10/2023 | Vartakavi et al. |

*Primary Examiner* — Rong Le

(57) ABSTRACT

Example apparatus disclosed herein are to compare first monitored media signatures associated with an advertisement block to a plurality of sequences of monitored media signatures associated with a first time period; determine a start boundary and an end boundary of a first advertisement in the advertisement block based on the comparison of the first monitored media signatures and the plurality of sequences of monitored media signatures, the first advertisement associated with second monitored media signatures representative of a subset of the first monitored media signatures between the start boundary and the end boundary; generate an entry in an advertisement relationship graph for the second monitored media signatures, the entry to map second monitored media signatures to the first advertisement; and credit media exposure to the first advertisement based on the second monitored media signatures in the advertisement relationship graph.

20 Claims, 13 Drawing Sheets

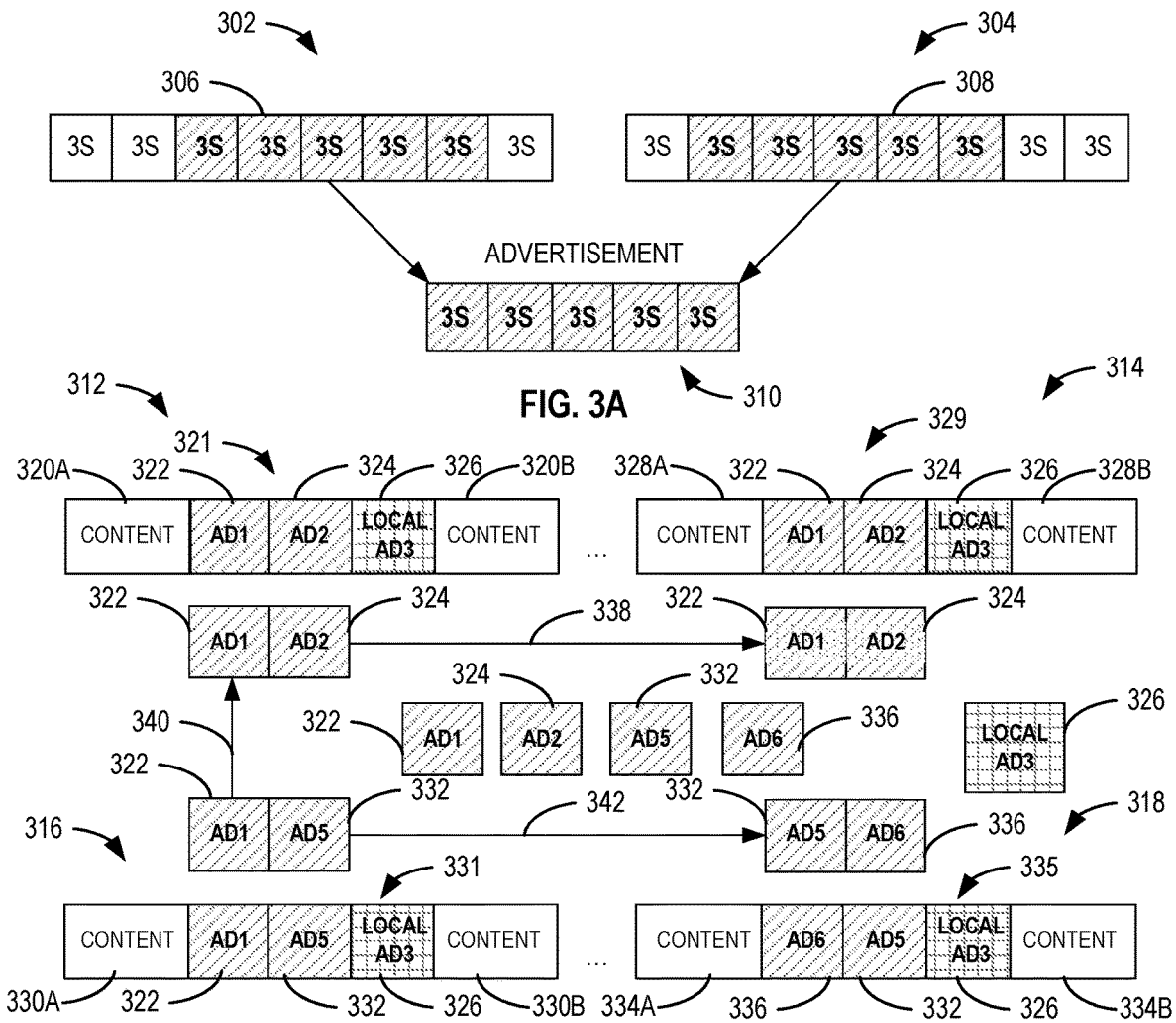
FIG. 3A
FIG. 3B
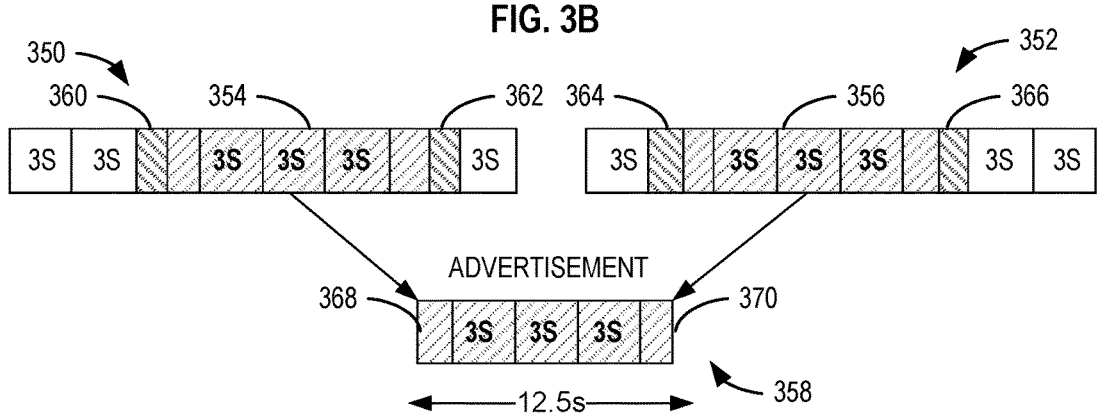
FIG. 3C

SYSTEMS AND METHODS FOR ADAPTIVE ADJUSTMENT OF ADVERTISEMENT BOUNDARIES IN MEDIA

CROSS-REFERENCE TO RELATED APPLICATIONS

This application claims priority to U.S. Patent Application No. 63/392,338, filed Jul. 26, 2022. U.S. Patent Application No. 63/392,338 is hereby incorporated by reference in its entirety.

FIELD OF THE DISCLOSURE

This disclosure relates generally to media identification systems and, more particularly, to systems and methods for adaptive adjustment of advertisement boundaries in media.

BACKGROUND

A media monitoring entity can generate signatures (also referred to as media signatures, which can be audio signatures, video signatures, etc.) from a media signal (e.g., an audio signal, a video signal, etc.). Signatures are a condensed reference that can be used to subsequently identify the media. In some examples, a media monitoring entity can monitor a media source feed (e.g., a television feed, etc.) to generate reference signatures representative of media presented via that media source feed. Such reference signatures can be compared to signatures generated by media monitors to credit exposure to the media.

BRIEF DESCRIPTION OF THE DRAWINGS

FIGS. 3A-3C are schematic illustrations of identifying advertisements in sequences of monitored media signatures in accordance with the teachings of this disclosure.

FIGS. 5A-5C are illustrations of example tables of identifying advertisements from unknown blocks of signatures in an example commercial break of a media broadcast.

In general, the same reference numbers will be used throughout the drawing(s) and accompanying written description to refer to the same or like parts. The figures are not to scale.

Figure 1:
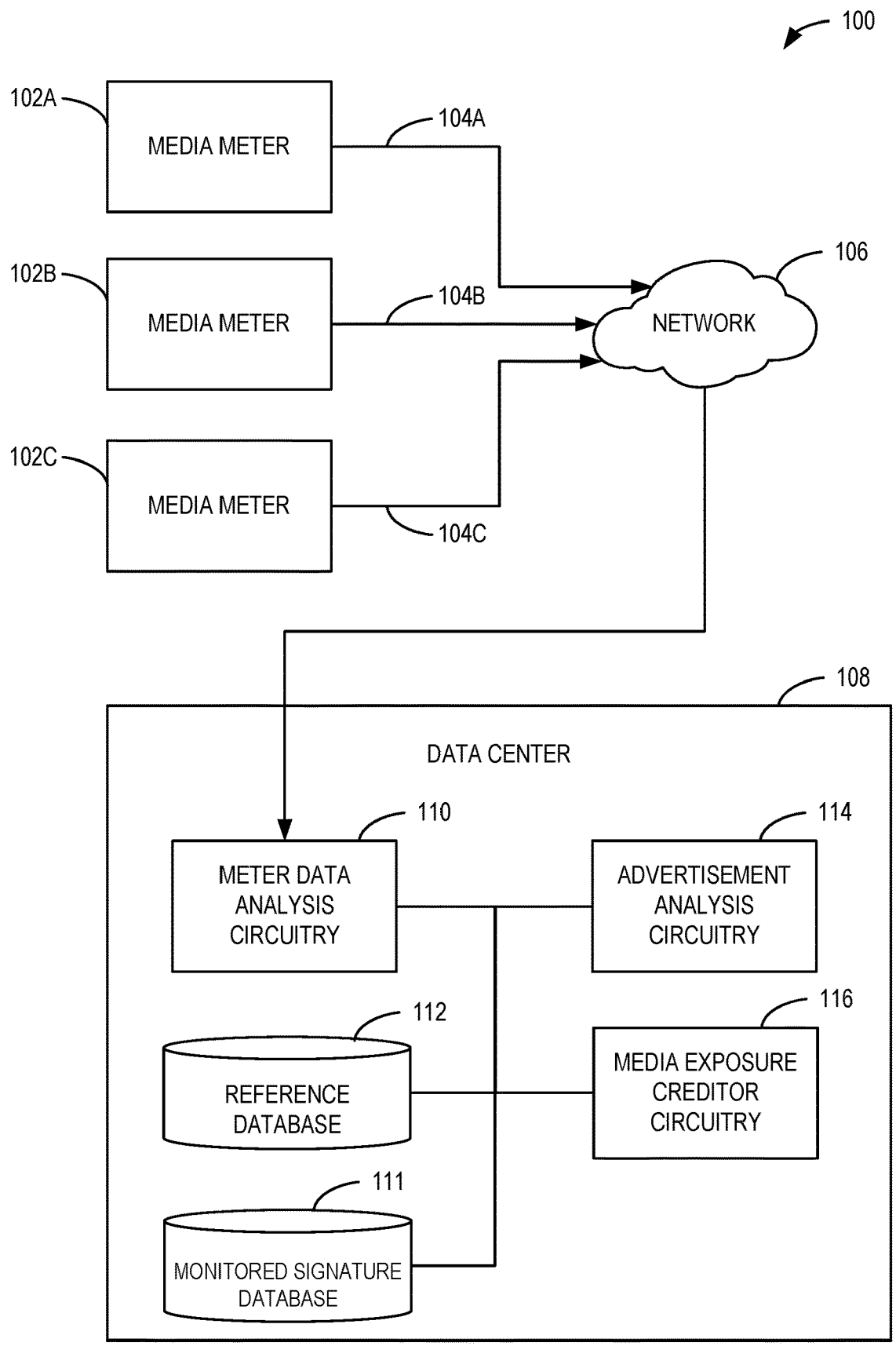
FIG. 1 is a block diagram of an example environment in which the teachings of this disclosure may be implemented.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

As used herein, the term "media" includes any type of content and/or advertisement delivered via any type of distribution medium. Thus, media includes television programming or advertisements, radio programming or advertisements, movies, web sites, streaming media, etc. As used herein, the term "media asset" refers to any individual, collection, or portion/piece of media of interest. For example, a media asset may be a television show episode, a movie, a clip, a commercial, etc. Media assets can be identified via unique media identifiers (e.g., a name of the media asset, a metadata tag, etc.). Media assets can be presented by any type of media presentation method (e.g., via streaming, via live broadcast, from a physical medium, etc.).

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

In some examples, media monitoring information is aggregated to determine ownership and/or usage statistics of media devices, determine the media presented by the media devices, determine audience ratings, determine relative rankings of usage and/or ownership of media devices, determine types of uses of media devices (e.g., whether a device is used for browsing the Internet, streaming media from the Internet, etc.), determine other types of media device information, etc. In examples disclosed herein, monitoring information includes, but is not limited to, one or more of media identifying information (e.g., media-identifying metadata, codes, signatures, watermarks, and/or other information that may be used to identify presented media), application usage information (e.g., an identifier of an application, a time and/or duration of use of the application, a rating of the application, etc.), user-identifying information (e.g., demographic information, a user identifier, a panelist identifier, a username, etc.), etc.

Media monitoring entities, such as The Nielsen Company (US), LLC, desire knowledge regarding how users interact with media devices such as smartphones, tablets, laptops, smart televisions, etc. For example, media monitoring entities may monitor media presentations made at the media devices to, among other things, monitor exposure to advertisements, determine advertisement effectiveness, determine user behavior, identify purchasing behavior associated with various demographics, etc. Media monitoring entities can provide media meters to people (e.g., panelists) which can generate media monitoring data based on the media exposure of those users. Such media meters can be associated with a specific media device (e.g., a television, a mobile phone, a computer, etc.) and/or a specific person (e.g., a portable meter, etc.).

In some examples, media monitoring entities utilize signature matching to identify media. Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the terms "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing those monitored signature(s) to one or more references signatures corresponding to known (e.g., reference) media source feeds. Various comparison criteria, such as a cross-correlation value, a Hamming distance, etc., can be evaluated to determine whether a monitored signature matches a particular reference signature. When a match between the monitored signature and a reference signature is found, the monitored media can be identified as corresponding to the particular reference media represented by the reference signature that matched with the monitored signature. In some examples, signature matching is based on sequences of signatures such that, when a match between a sequence of monitored signatures and a sequence of reference signatures is found, the monitored media can be identified as corresponding to the particular reference media represented by the sequence of reference signatures that matched the sequence of monitored signatures. Because attributes, such as an identifier of the media, a presentation time, a broadcast channel, etc., are collected for the reference signature(s), these attributes may then be associated with the monitored media whose monitored signature matched the reference signature(s). Example systems for identifying media based on codes and/or signatures are long known and were first disclosed in Thomas, U.S. Pat. No. 5,481,294, which is hereby incorporated by reference in its entirety.

Media monitoring entities can generate media reference databases that can include unhashed signatures, hashed signatures, and watermarks. These references are generated by a media monitoring entity (e.g., at a media monitoring station (MMS), etc.) by monitoring a media source feed, identifying any encoded watermarks and/or determining signatures associated with the media source feed. In some examples, the media monitoring entity can hash the determined signatures. A media monitoring entity may additionally and/or alternatively generate reference signatures for downloaded reference media, reference media transmitted to the media monitoring entity from one or more media providers, etc. In some examples, media monitoring entities store generated reference databases and gathered monitoring data on cloud storage services (e.g., Amazon Web Services™, etc.).

The reference database can be compared (e.g., matched, etc.) to media monitoring data (e.g., watermarks, unhashed signatures, hashed signatures, etc.) gathered by media meter (s) to allow crediting of media exposure. Monitored media can be credited using one, or a combination, of watermarks, unhashed signatures and hashed signatures.

In the examples of media from broadcast television and over-the-air (OTA) TV, the media periodically or aperiodically enters a commercial/advertisement break. In such examples, a commercial break many include a one or more of advertisements that are played back to back. Typically, without manual/human intelligence/intervention, it is difficult for machines to identify a precise start and end of an advertisement boundary to second/sub-second level precision and to identify a transition point from one advertisement to the other during the commercial break. In some examples, the timing of the commercial breaks are not accurate to the second level precision. In such examples, relying on a commercial break schedule can result in content-spillover (e.g., media content being treated/identified as an advertisement break), which can be caused by the commercial break being delayed due to extended programming content. In some examples, relying on a commercial break schedule can also result in truncated advertisements (e.g., an advertisement being truncated at the end of the commercial break), which can be caused by the programming-restart is delayed.

Techniques to identify the location of commercial break during a media broadcast are known. For example, SCTE-35 specifications provide cue signaling to indicate, for example, a commercial break start and end, blanks frame and black frames between programming and a commercial break, audio silence, scene transition, scene change, etc. Although prior techniques, such as those based on the SCTE-35 specifications, attempt to identify the location of a commercial break during a media broadcast, such techniques are not able to identify the start and ends of individual advertisements included in the commercial break.

Example methods and apparatus disclosed herein improve the accuracy of detecting individual advertisement start and advertisement end positions within a commercial break. Examples disclosed herein provide a mechanism to find and refine advertisement detection based on similarity scores between sequences of signatures. While prior techniques have focused on finding stream, video and audio features to hint at the start and end boundaries of a commercial break (which may correspond to an advertisement pod containing multiple individual advertisements), examples disclosed herein rely on repetitive patterns in audio and/or video data to find advertisements and refine the start and end boundaries. Using audio/video signature/fingerprint technology, examples disclosed herein create a graph of similarity score relationships between audio/video signature blocks of configurable size (e.g., three seconds) included in each commercial break across a plurality of TV stations/broadcasts. In examples disclosed herein, the graph of these relationships is then traversed and analyzed to generate a contiguous sequence of signatures with high similarity scores. In some examples, a high similarly score is a similarity score that meets or exceeds a threshold for matches between signatures of different commercial breaks. In examples disclosed herein, high occurrences of such contiguous sequences of signatures that are related with each other through transitive relationships are identified as a single advertisement. Examples disclosed herein add the contiguous sequences included in the transitive relationship to a collection of known advertisements in the reference database. Examples disclosed herein use a regression technique to continuously merge and split blocks as more time progresses to correct the boundaries of the known advertisement.

FIG. 1 is a block diagram of an example environment 100 in which the teachings of this disclosure may be implemented. The example environment includes an example first media meter 102A, an example second media meter 102B and an example third media meter 102C, which output example first monitoring data 104A, example second monitoring data 104B, and example third monitoring data 104C, respectively, to an example network 106. The environment 100 further includes an example data center 108, which includes example meter data analysis circuitry 110, and example monitored signature database 111, an example reference database 112, example advertisement analysis circuitry 114, and example media exposure creditor circuitry 116.

The example media meters 102A, 102B, 102C collect media monitoring information. In some examples, the media meters 102A, 102B, 102C are associated with (e.g., installed on, coupled to, etc.) respective media devices. For example, a media device associated with one of the media meters 102A, 102B, 102C presents media (e.g., via a display, etc.). In some examples, the media device associated with one of the media meters 102A, 102B, 102C additionally or alternatively presents the media on separate media presentation equipment (e.g., speakers, a display, etc.). For example, the media device(s) associated with the media meters 102A, 102B, 102C can include a personal computer, an Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), televisions, desktop computers, laptop computers, servers, etc. In such examples, the media meters 102A, 102B, 102C can have direct connections (e.g., physical connections) to the devices to be monitored, and/or may be connected wirelessly (e.g., via Wi-Fi, via Bluetooth, etc.) to the devices to be monitored.

Additionally or alternatively, in some examples, one or more of the media meters 102A, 102B, 102C are portable meters carried by one or more individual people. In the illustrated example, the media meters 102A, 102B, 102C monitor media presented to one or more people associated with the media meters 102A, 102B, and 102C and generate the example monitoring data 104A, 104B, 104C. In some examples, monitoring data 104A, 104B, 104C generated by the media meters 102A, 102B, 102C can include signatures associated with the presented media. For example, the media meters 102A, 102B, 102C can determine a signature (e.g., generate signatures, extract signatures, etc.) associated with the presented media. Such signatures may be referred to as monitored media signatures or monitored signatures as they are determined from media monitored by the media meters 102A, 102B, 102C. Example signature generation techniques that may be implemented by the media meters 102A, 102B, 102C include, but are not limited to, examples disclosed in U.S. Pat. No. 4,677,466 issued to Lert et al. on Jun. 30, 1987; U.S. Pat. No. 5,481,294 issued to Thomas et al. on Jan. 2, 1996; U.S. Pat. No. 7,460,684 issued to Srinivasan on Dec. 2, 2008; U.S. Pat. No. 9,438,940 issued to Nelson on Sep. 6, 2016; U.S. Pat. No. 9,548,830 issued to Kariyappa et al. on Jan. 17, 2017; U.S. Pat. No. 9,668,020 issued to Nelson et al. on May 30, 2017; U.S. Pat. No. 10,200,546 issued to Nelson et al. on Feb. 5, 2019; U.S. Publication No. 2005/0232411 to Srinivasan et al. published on Oct. 20, 2005; U.S. Publication No. 2006/0153296 to Deng published on Jul. 13, 2006; U.S. Publication No. 2006/0184961 to Lee et al. published on Aug. 17, 2006; U.S. Publication No. 2006/0195861 to Lee published on Aug. 31, 2006; U.S.

Publication No. 2007/0274537 to Srinivasan published on Nov. 29, 2007; U.S. Publication No. 2008/0091288 to Srinivasan published on Apr. 17, 2008; and U.S. Publication No. 2008/0276265 to Topchy et al. published on Nov. 6, 2008.

Accordingly, the respective monitoring data 104A, 104B, 104C can include monitored media signatures representative of the media monitored by the corresponding media meters 102A, 102B, 102C. In some examples, the monitoring data 104A, 104B, 104C is associated with a discrete, measurement time period (e.g., five minutes, ten minutes, etc.). In such examples, the monitoring data 104A, 104B, 104C can include sequences of monitored media signatures associated with media asset(s) (or portions thereof) presented by the media devices monitored by the media meters 102A, 102B, 102C.

The example network 106 is a network used to transmit the monitoring data 104A, 104B, 104C to the data center 108. In some examples, the network 106 can be the Internet or any other suitable external network. In other examples, the network 106 can be a cable broadcast system and the monitoring data 104A, 104B, 104C could be return path data (RPD). In other examples, any other suitable means of transmitting the monitoring data 104A, 104B, 104C to the data center 108 can be used.

The example data center 108 is an execution environment used to implement the example meter data analysis circuitry 110, the example monitored signature database 111, the example reference database 112, the example advertisement analysis circuitry 114, and the example media exposure creditor circuitry 116. In some examples, the data center 108 is associated with a media monitoring entity. In some examples, the data center 108 can be a physical processing center (e.g., a central facility of the media monitoring entity, etc.). Additionally or alternatively, the data center 108 can be implemented via a cloud service (e.g., AWS™, etc.). In the illustrated example, the data center 108 can further store and process generated watermark and signature reference data.

The example meter data analysis circuitry 110 processes the gathered media monitoring data to detect, identify, credit, etc., respective media assets and/or portions thereof (e.g., media segments) associated with the corresponding monitoring data 104A, 104B, 104C. For example, the meter data analysis circuitry 110 can compare the monitoring data 104A, 104B, 104C to generate reference data to determine what respective media assets and/or media segments are associated with the corresponding monitoring data 104A, 104B, 104C. The example meter data analysis circuitry 110 collects the monitoring data 104A, 104B, 104C from the example network 106. In some examples, the meter data analysis circuitry 110 can convert the monitoring data 104A, 104B, 104C into a format readable by the meter data analysis circuitry 110. In some examples, the meter data analysis circuitry 110 can be in continuous communication with the network 106, the first media meter 102A, the second media meter 102B and/or the third media meter 102C. In some examples, the meter data analysis circuitry 110 can be in intermittent (e.g., periodic or aperiodic) communication with the network 106, the first media meter 102A, the second media meter 102B and/or the third media meter 102C. The example meter data analysis circuitry 110 obtains the sequences of monitored media signatures from the monitoring data 104A, 104B, 104C.

The meter data analysis circuitry 110 of the illustrated example also analyzes the monitoring data 104A, 104B, 104C to determine if a media asset, and/or particular portion(s) (e.g., segment(s)) thereof, is to be credited as a media exposure represented in the monitoring data 104A, 104B, 104C. The example meter data analysis circuitry 110 obtains a sequence of monitored media signatures from the monitoring data 104A, 104B, 104C associated with a time period (e.g., 30 seconds, five minutes, etc.) and stores the monitored media signatures in the example monitored signature database 111. The example meter data analysis circuitry 110 compares the sequence of monitored media signatures in the example monitoring data 104A, 104B, 104C to the reference signatures in the example reference database 112 to identify media assets associated with monitoring data 104A, 104B, 104C. For example, the meter data analysis circuitry 110 can determine if the sequence of monitored media signatures, or a portion thereof, matches any reference signatures stored in the reference database 112. In some examples, some or all of the signatures in the sequence of monitored media signatures can match with corresponding reference signatures in the reference database 112 that represent a reference media asset (e.g., reference signatures associated with a reference advertisement, etc.). In some examples, the meter data analysis circuitry 110 determines if the sequence of monitored media signatures matches at least one reference advertisement.

In some examples disclosed herein, the meter data analysis circuitry 110 may perform matching using any suitable means (e.g., linear matching, hashed matching, etc.). In some examples, the meter data analysis circuitry 110 compares a sequence of monitored media signatures to reference signatures from the reference database 112. The example meter data analysis circuitry 110 determines strong matches between the sequence of monitored media signatures to the reference signatures to identify a reference media asset. As used herein, a "strong match" is based on the number of signature matches that occur within the time period. For example, a strong match can correspond to relatively high number of signature matches in a period of time (e.g., one signature match per second, five signature matches per second, etc.). However, any other suitable number of signature matches in the time period can correspond to strong matching. In some examples, the meter data analysis circuitry 110 identifies a reference advertisement corresponding to a strong match using an advertisement relationship graph from the example advertisement analysis circuitry 114 described in further detail below. In such examples, the example meter data analysis circuitry 110 identifies a strong match between the sequence of monitored media signatures to a sequence of reference signatures that are mapped to a reference advertisement included in the advertisement relationship graph.

In some examples, the data center 108 includes means for determining if the sequence of monitored media signatures matches at least one reference advertisement. For example, the means for determining may be implemented by the example meter data analysis circuitry 110. In some examples, the meter data analysis circuitry 110 may be instantiated by processor circuitry such as the example processor circuitry 812 of FIG. 8. For instance, the meter data analysis circuitry 110 may be instantiated by the example general purpose processor circuitry 900 of FIG. 9 executing machine executable instructions such as that implemented by at least blocks 702, 704, 706, 708, 710 of FIG. 7. In some examples, the meter data analysis circuitry 110 may be instantiated by hardware logic circuitry, which may be implemented by an ASIC or the FPGA circuitry 1000 of FIG. 10 structured to perform operations corresponding to the machine readable instructions. Additionally or alternatively, the meter data analysis circuitry 110 may be instantiated by any other combination of hardware, software, and/or firmware. For example, the meter data analysis circuitry 110 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example reference database 112 includes reference signatures, reference watermarks, and other reference data created or otherwise obtained by the data center 108 to be used to identify and/or represent the reference media assets. In some examples, the media monitoring entity associated with the reference database 112 can directly monitor media source feeds to generate reference signatures. Additionally or alternatively, the media monitoring entity associated with the reference database 112 can generate reference signatures from downloaded reference media, etc. In examples disclosed herein, reference signatures are generated using the same or similar techniques as the monitored media signatures, such that the monitored media signatures and reference signatures of the same media asset match. In some examples, each reference signature stored in the reference database 112 is associated with a specific reference media asset, such as, but not limited to, episodes of television programs (e.g., episodes of The Crown, Game of Thrones, The Office, etc.), movies of a movie collection (e.g., The Marvel Cinematic Universe, etc.), an advertisement, etc.

The example advertisement analysis circuitry 114 implements any appropriate technique or techniques to identify a commercial break (e.g., an advertisement pod) in the monitored media corresponding to the monitoring data 104A, 104B, 104C. For example, the advertisement analysis circuitry 114 can utilize cue signaling, as described above, to identify the start and end of a commercial break. Further, the example advertisement analysis circuitry 114 implements example techniques disclosed herein to identify individual advertisement start boundaries and end boundaries within a commercial break. For example, the advertisement analysis circuitry 114 determines repetitive patterns in the sequences of monitored media signatures from the monitoring data 104A, 104B, 104C to determine start and end boundaries of advertisements. In some examples, the advertisement analysis circuitry 114 creates a graph of similarity score relationships between unknown to unknown signature blocks and unknown to known signatures blocks that have configurable size (e.g., three seconds) of monitored media signatures included in each commercial break across a plurality of TV stations/broadcasts. As used herein, known signature blocks refer to blocks of monitored signatures from monitoring data 104A, 104B, 104C that are determined to match corresponding reference signature blocks in the reference database 112, whereas unknown signature blocks refer to blocks of monitored signatures from monitoring data 104A, 104B, 104C that do not have matches in the reference database 112. The example advertisement analysis circuitry 114 traverses and analyzes the similarity graph to generate a contiguous sequence of signatures with high similarity scores. In some examples, a high similarly score is a similarity score that meets or exceeds a threshold (e.g., a number of matching signatures in the block) for matches between signatures of different commercial breaks. The example advertisement analysis circuitry 114 determines a single reference advertisement based on high occurrences of such contiguous sequences of signatures that are related with each other through transitive relationships. Examples disclosed herein add the contiguous sequences as an individual reference advertisement to a collection of known reference advertisements in the reference database 112. The example advertisement analysis circuitry 114 uses a regression technique to continuously merge and split signature blocks as more time progresses to correct the boundaries of the known reference advertisements. An example implementation of the advertisement analysis circuitry 114 is described below in conjunction with FIG. 2.

The example media exposure creditor circuitry 116 uses identification data associated with the reference media assets (e.g., reference advertisement) identified by the meter data analysis circuitry 110 to credit the media exposure of the reference media assets to user(s) associated with the media meters 102A, 102B, 102C. In some examples, the identification data includes associations between the media monitoring data and particular reference media assets. In some examples, the media exposure creditor circuitry 116 credits the media exposure to the reference media asset associated with reference data (e.g., reference signature, reference watermarks, etc.) determined to match the monitored media data (e.g., monitored media signatures, etc.). In some examples, the media exposure creditor circuitry 116 credits the media exposure to the identified reference advertisement associated with the reference signatures determined to match the sequence of monitored media signatures from the meter data analysis circuitry 110. In some examples, the media exposure creditor circuitry 116 credits the media exposure to the reference advertisement associated with a sequence of reference signatures mapped to the reference advertisement in the advertisement relationship graph from the example advertisement analysis circuitry 114. In such examples, the media exposure creditor circuitry 116 credits the media exposure to the reference advertisement mapped to the reference signatures determined to match the sequence of monitored media signatures by the meter data analysis circuitry 110.

In some examples, the data center 108 includes means for crediting media exposure of reference media assets (e.g., reference advertisements). For example, the means for crediting may be implemented by the example media exposure creditor circuitry 116. In some examples, the media exposure creditor circuitry 116 may be instantiated by processor circuitry such as the example processor circuitry 812 of FIG. 8. For instance, the media exposure creditor circuitry 116 may be instantiated by the example general purpose processor circuitry 900 of FIG. 9 executing machine executable instructions such as that implemented by at least block 712 of FIG. 7. In some examples, the media exposure creditor circuitry 116 may be instantiated by hardware logic circuitry, which may be implemented by an ASIC or the FPGA circuitry 1000 of FIG. 10 structured to perform operations corresponding to the machine readable instructions. Additionally or alternatively, the media exposure creditor circuitry 116 may be instantiated by any other combination of hardware, software, and/or firmware. For example, the media exposure creditor circuitry 116 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 2:
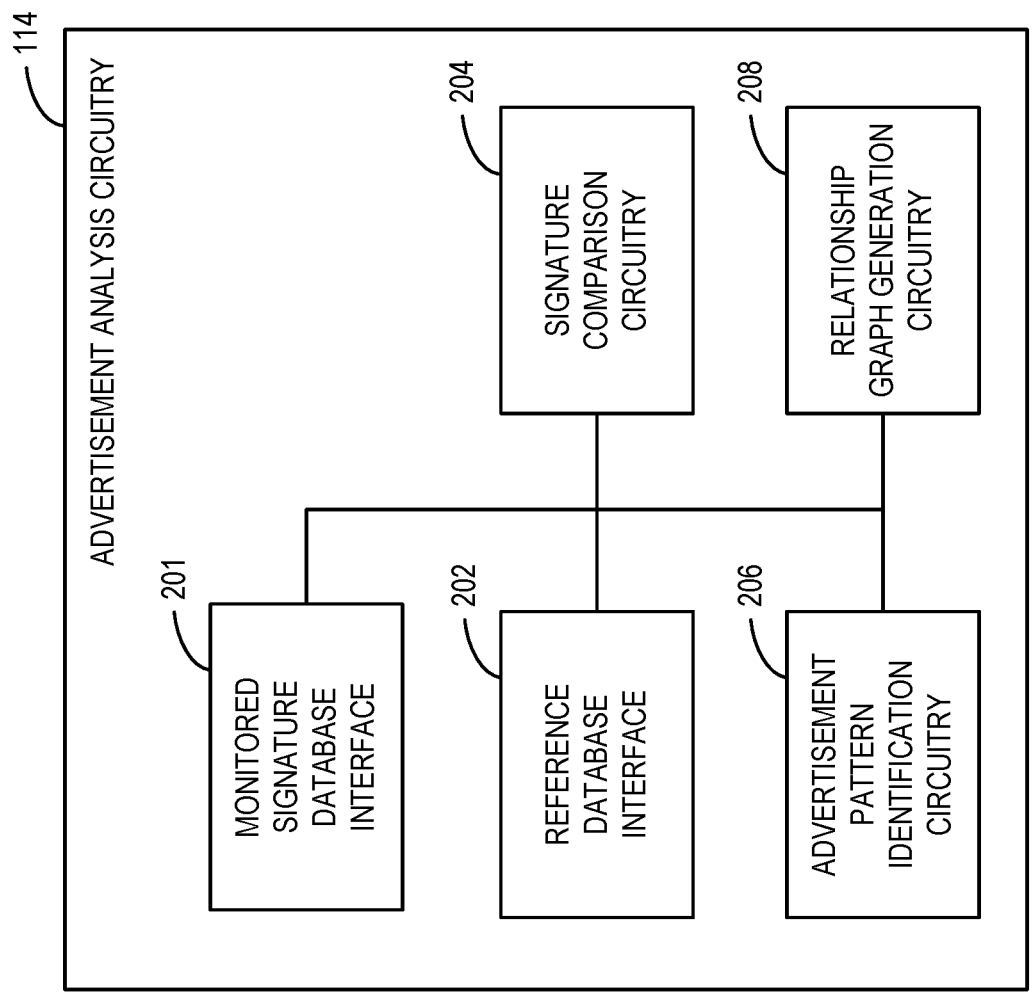
FIG. 2 is a block diagram of example advertisement analysis circuitry included in the example environment of FIG. 1.

FIG. 2 is a block diagram of the example advertisement analysis circuitry 114 to identify individual advertisement start boundaries and end boundaries within a commercial break. The example advertisement analysis circuitry 114 of FIG. 2 may be instantiated (e.g., creating an instance of, bring into being for any length of time, materialize, implement, etc.) by processor circuitry such as a central processing unit executing instructions. Additionally or alternatively, the example advertisement analysis circuitry 114 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

In the illustrated example, the advertisement analysis circuitry 114 includes an example monitored signature database interface 201 to obtain monitored media signatures from the example monitoring data 104A, 104B, 104C collected by the example meter data analysis circuitry 110 of FIG. 1 and stored in the monitored signature database 111. In some examples, the monitored signature database interface 201 obtains blocks of monitored media signatures from the example monitoring data 104A, 104B, 104C already identified by the advertisement analysis circuitry 114 as associated with a commercial break. Thus, in some such examples, the example monitoring data 104A, 104B, 104C is representative of commercial breaks across different TV stations/broadcasts. For example, the monitoring data 104A includes monitored media signatures associated with a commercial break on a first TV station (e.g., ABC), and the monitoring data 104B includes monitored media signatures associated with a commercial break on a second TV station (e.g., NBC). In some examples, an example reference database interface 202 is also included in the advertisement analysis circuitry 114 to obtain reference signatures from the example reference database 112 of FIG. 1.

In some examples, the advertisement analysis circuitry 114 includes means for obtaining signatures. For example, the means for obtaining may be implemented by the monitored signature database interface 201 and/or the reference database interface 202. In some examples, the monitored signature database interface 201 and/or the reference database interface 202 may be instantiated by processor circuitry such as the example processor circuitry 812 of FIG. 8. For instance, the monitored signature database interface 201 and/or the reference database interface 202 may be instantiated by the example general purpose processor circuitry 900 of FIG. 9 executing machine executable instructions such as that implemented by at least block 602 of FIG. 6 In some examples, the monitored signature database interface 201 and/or the reference database interface 202 may be instantiated by hardware logic circuitry, which may be implemented by an ASIC or the FPGA circuitry 1000 of FIG. 10 structured to perform operations corresponding to the machine readable instructions. Additionally or alternatively, the monitored signature database interface 201 and/or the reference database interface 202 may be instantiated by any other combination of hardware, software, and/or firmware. For example, the monitored signature database interface 201 and/or the reference database interface 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example advertisement analysis circuitry 114 of FIG. 2 includes example signature comparison circuitry 204 to identify advertisement blocks from the monitored media signatures obtained by the example reference database interface 202. In some examples, the signature comparison circuitry 204 obtains the monitored media signatures from the monitored signature database interface 201 and parses the monitored media signatures into blocks of configurable size (e.g., three seconds, five seconds, etc.). The example signature comparison circuitry 204 compares the monitored media signatures of the identified advertisement blocks from the different monitoring data 104A, 104B, 104C across the different TV networks/broadcasts. For example, the signature comparison circuitry 204 compares monitored media signatures from first monitoring data (e.g., monitoring data 104A) that are associated with an advertisement block corresponding to a given time period with other monitored media signatures from other monitoring data (e.g., monitoring data 104B, 104C) that are also associated with advertisement blocks corresponding to that given time period.

In some examples, the advertisement analysis circuitry 114 includes means for comparing monitored media signatures and reference media signatures. For example, the means for comparing may be implemented by the example signature comparison circuitry 204. In some examples, the signature comparison circuitry 204 may be instantiated by processor circuitry such as the example processor circuitry 812 of FIG. 8. For instance, the signature comparison circuitry 204 may be instantiated by the example general purpose processor circuitry 900 of FIG. 9 executing machine executable instructions such as that implemented by at least blocks 604, 606 of FIG. 6. In some examples, signature comparison circuitry 204 may be instantiated by hardware logic circuitry, which may be implemented by an ASIC or the FPGA circuitry 1000 of FIG. 10 structured to perform operations corresponding to the machine readable instructions. Additionally or alternatively, the signature comparison circuitry 204 may be instantiated by any other combination of hardware, software, and/or firmware. For example, the signature comparison circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example advertisement analysis circuitry 114 of FIG. 2 includes example advertisement pattern identification circuitry 206 to determine boundaries of individual advertisements from the advertisement blocks that are included in an identified commercial break. In some examples, advertisement pattern identification circuitry 206 determines the boundaries of individual advertisements based on the comparison of monitored media signatures of the identified advertisement blocks. The example advertisement pattern identification circuitry 206 determines a start boundary and an end boundary of an individual advertisement from the advertisement blocks based on the comparison of the different sequences monitored media signatures from the monitoring data 104A, 104B, 104C. In some examples, the advertisement pattern identification circuitry 206 identifies the individual advertisement by identifying a repeating sequence of monitored media signatures included in the different sequences of monitored media signatures included in the respective monitoring data 104A, 104B, 104C.

In some examples, the advertisement pattern identification circuitry 206 creates a graph of similarity score relationships (e.g., a similarity graph) between unknown advertisement blocks to unknown advertisement blocks of signatures (e.g., advertisement blocks including monitored media signatures not identified in the reference signatures of the reference database 112) and unknown advertisement blocks to known advertisement blocks of signatures (e.g., advertisement blocks including monitored media signatures identified in the reference signatures of the reference database 112) appearing during the commercial break across different TV stations/broadcasts (e.g., the different monitoring data 104A, 104B, 104C). For example, the advertisement pattern identification circuitry 206 compares the monitored media signatures included in the advertisement blocks from the monitoring data 104A, 104B, 104C amongst each other and also compares the monitored media signatures included in the advertisement blocks to reference signatures blocks of configurable size (e.g., three second, five seconds, etc.) to determine similarity scores. In such examples, a similarity score is representative of a number of matching signatures between the compared blocks of signatures (e.g., between respective monitored media signatures of different advertisement blocks and/or between monitored media signatures and the reference signatures from the example reference database 112). In some examples, the advertisement pattern identification circuitry 206 generates the similarity graph of relationships between the monitored media signatures of the different advertisement blocks. The example advertisement pattern identification circuitry 206 traverses the similarity graph to generate a contiguous sequence of advertisement blocks with high similarity scores. In some examples, a high similarity score is determined using a threshold (e.g., a number of signature matches). For example, two advertisement blocks have a high similarity score when the number of signature matches between the two advertisement blocks meets or exceeds a similarity threshold. In some examples, advertisement blocks having a high similarity score indicates the monitored media signatures included in the advertisement blocks were repeated in the sequences of monitored media signatures of the monitoring data 104A, 104B, 104C. In some examples, the advertisement pattern identification circuitry 206 generates independent branches in the similarity graph that are representative of different contiguous sequences of advertisement blocks with high similarity scores. The example advertisement pattern identification circuitry 206 identifies an individual advertisement based on the contiguous sequences of advertisement blocks with high similarity scores.

In some examples, the advertisement pattern identification circuitry 206 determines the start boundary and end boundary of an individual advertisement based on the consecutive sequences of monitored media signatures in the contiguous sequences of advertisement blocks determined to have high similarity scores. The example advertisement pattern identification circuitry 206 determines the start boundary of the individual advertisement as the first monitored media signature in the group of consecutive sequences of monitored media signatures. The example advertisement pattern identification circuitry 206 determines the end boundary of the individual advertisement as the last monitored media signature in the group of consecutive sequences of monitored media signatures. In some examples, the advertisement pattern identification circuitry 206 defines the sequence of monitored media signatures between the start boundary and the end boundary as representative of the individual advertisement. In some examples, the advertisement pattern identification circuitry 206 stores that sequence of monitored media signatures as reference signatures associated with the individual advertisement in the reference database 112.

In some examples, the advertisement pattern identification circuitry 206 determines variations of the boundaries of individual advertisements. In some examples, the advertisement pattern identification circuitry 206 may determine different start boundaries and different end boundaries for an individual advertisement based on variation of the individual advertisement across different TV networks/broadcasts. For example, an advertisement may be modified from its original version on different TV networks/broadcasts (e.g., the advertisement may be shortened in time, the advertisement may be modified to target a particular audience, etc.). In some examples, these variations of the individual advertisement are represented as other independent branches in the similarity graph that include high similarity scores in relation to the particular branch for that individual advertisement. In some examples, the advertisement pattern identification circuitry 206 continuously merges and splits advertisement blocks as time progresses to correct boundaries of known individual advertisements.

In some examples, the advertisement analysis circuitry 114 includes means for determining boundaries of individual advertisements. For example, the means for determining may be implemented by the example advertisement pattern identification circuitry 206. In some examples, the advertisement pattern identification circuitry 206 may be instantiated by processor circuitry such as the example processor circuitry 812 of FIG. 8. For instance, the advertisement pattern identification circuitry 206 may be instantiated by the example general purpose processor circuitry 900 of FIG. 9 executing machine executable instructions such as that implemented by at least block 608 of FIG. 6. In some examples, the advertisement pattern identification circuitry 206 may be instantiated by hardware logic circuitry, which may be implemented by an ASIC or the FPGA circuitry 1000 of FIG. 10 structured to perform operations corresponding to the machine readable instructions. Additionally or alternatively, the advertisement pattern identification circuitry 206 may be instantiated by any other combination of hardware, software, and/or firmware. For example, the advertisement pattern identification circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example of FIG. 2, the example advertisement analysis circuitry 114 includes example relationship graph generation circuitry 208 to generate an advertisement relationship graph between variations of boundaries of individual advertisements. In some examples, the relationship graph generation circuitry 208 generates an entry in the advertisement relationship graph for a sequence of monitored media signatures, which is to map the sequence of monitored media signatures to an individual advertisement in the advertisement relationship graph, and which is to be used to credit media exposure to the individual advertisement. The example relationship graph generation circuitry 208 generates an advertisement relationship graph based on the contiguous sequences of advertisement blocks included in the similarity graph from the example advertisement pattern identification circuitry 206. In some examples, the relationship graph generation circuitry 208 tags all related branches in the similarity graph as occurrences of the individual advertisement (e.g., based on the different variations in the individual advertisement across TV networks/broadcasts). In such examples, the relationship graph generation circuitry 208 maps the different sequences of signatures associated with the different contiguous sequences of advertisement blocks to the same individual advertisement to account for the variations in boundaries of the individual advertisement (e.g., a shortened version of the advertisement, a targeted version of the advertisement to a specific audience, etc.). In some examples, the relationship graph generation circuitry 208 stores the sequences of signatures included in the variations of boundaries of the individual advertisements in the reference database 112 to be accessed with the advertisement relationship graph for the example media exposure creditor circuitry 116 to use to credit media exposure to the individual advertisement. For example, the advertisement relationship graph associates the different sequences of signatures with the individual advertisement, and the media exposure creditor circuitry 116 credits the media exposure to the individual advertisement when the collected monitored media signatures match any one of the different sequences of signatures mapped to the individual advertisement.

In some examples, the advertisement analysis circuitry 114 includes means for generating an advertisement relationship graph. For example, the means for generating may be implemented by the example relationship graph generation circuitry 208. In some examples, the relationship graph generation circuitry 208 may be instantiated by processor circuitry such as the example processor circuitry 812 of FIG. 8. For instance, the relationship graph generation circuitry 208 may be instantiated by the example general purpose processor circuitry 900 of FIG. 9 executing machine executable instructions such as that implemented by at least blocks 610, 612 of FIG. 6. In some examples, the relationship graph generation circuitry 208 may be instantiated by hardware logic circuitry, which may be implemented by an ASIC or the FPGA circuitry 1000 of FIG. 10 structured to perform operations corresponding to the machine readable instructions. Additionally or alternatively, the relationship graph generation circuitry 208 may be instantiated by any other combination of hardware, software, and/or firmware. For example, the relationship graph generation circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

FIGS. 3A-3C are schematic illustrations of identifying advertisements in sequences of monitored media signatures in accordance with the teachings of this disclosure. FIG. 3A illustrates the repetitive nature of advertisements used to identify an individual advertisement in media. The illustrated example of FIG. 3A includes an example first sequence of monitored media signatures 302 and an example second sequence of monitored media signatures 304. In some examples, the first sequence of monitored media signatures 302 is collected from a first TV network/broadcast, and the second sequence of monitored media signatures 304 is collected from a second TV network/broadcast. In the illustrated examples, the example first sequence of monitored media signatures 302 and the example second sequence of monitored media signatures 304 include blocks of signatures of configurable size (e.g., three seconds, represented as "3 S" in the figure). The example first sequence of monitored media signatures 302 includes an example sequence of signature blocks 306, and the example second sequence of monitored media signatures 304 includes an example sequence of signature blocks 308. In the illustrated example, the sequence of signature blocks 306 and the sequence of signature blocks 308 are the same. In such examples, the sequence of signature blocks 308 is a repeat of the sequence of signature blocks 306. In such examples, the sequence of signature blocks 306 and the sequence of signature blocks 308 are identified as an example advertisement 310. In examples disclosed herein, media content repeats in different TV networks/broadcasts. However, advertisements repeat more often, at different parts of the media content, and on different TV networks/broadcasts. In the illustrated example, a block of signatures (e.g., a three second block) from the first sequence of monitored media signatures 302 and/or the second sequence of monitored media signatures 304 is found to repeat in a different sequence of monitored media signatures from the same day. Given that an advertisement can correspond to a sequence of signatures having a duration of several seconds (e.g., six seconds, fifteen seconds, thirty seconds, etc.), an advertisement can be discovered from repeated signature blocks across different sequences of signature blocks (e.g., the sequence of signature blocks 306 and the sequence of signature blocks 308).

FIG. 3B illustrates a process of identifying different individual advertisements in commercial breaks during media broadcasts. In the illustrated example of FIG. 3B, individual advertisements are delivered in groups of advertisements during a commercial break. In the illustrated example, an individual advertisement in the group of advertisements can be determined by comparing different groups of advertisements from different networks/broadcasts over time to identify the boundaries of individual advertisements. The illustrated example of FIG. 3B includes an example first media broadcast 312, an example second media broadcast 314, an example third media broadcast 316, and an example fourth media broadcast 318. In some examples, the first media broadcast 312, the second media broadcast 314, the third media broadcast 316, and the fourth media broadcast 318 are from different TV networks/broadcasts.

The example first media broadcast 312 includes media content 320A, 320B and an example commercial break 321 between the media content 320A, 320B, and the commercial break 321 includes an example first advertisement 322, an example second advertisement 324, and an example local advertisement 326. The example second media broadcast 314 includes media content 328A, 328B and an example commercial break 329 between the media content 328A, 328B, and the commercial break 329 includes the first advertisement 322, the second advertisement 324, and the local advertisement 326. The example third media broadcast 316 includes media content 330A, 330B and an example commercial break 331 between the media content 330A, 330B, and the commercial break 331 includes the first advertisement 322, an example fifth advertisement 332, and the local advertisement 326. The example fourth media broadcast 318 includes media content 334A, 334B and an example commercial break 335 between the media content 334A, 334B, and the commercial break 335 includes an example sixth advertisement 336, the fifth advertisement 332, and the local advertisement 326.

In the illustrated example, the first media broadcast 312, the second media broadcast 314, the third media broadcast 316, and the fourth media broadcast 318 are compared to identify matching advertisements in the commercial breaks (e.g., the commercial break 321, the commercial break 329, the commercial break 331, and the commercial break 335). In the illustrated example, an example first comparison 338 between the first media broadcast 312 and the second media broadcast 314 determines a match of the first advertisement 322 and the second advertisement 324. An example second comparison 340 between the first media broadcast 312 and the third media broadcast 316 determines a match of the first advertisement 322. An example third comparison 342 between the third media broadcast 316 and the fourth media broadcast 318 determines a match of the fifth advertisement 332 and the sixth advertisement 336. In the illustrated examples, the first comparison 338, the second comparison 340, and the third comparison 342 are used to determine boundaries for each of the first advertisement 322, the second advertisement 324, the fifth advertisement 332, and the sixth advertisement 336.

FIG. 3C illustrates determining a start boundary and an end boundary for an individual advertisement. The illustrated example of FIG. 3C includes an example first sequence of monitored media signatures 350 and an example second sequence of monitored media signatures 352. In some examples, the first sequence of monitored media signatures 350 is collected from a first TV network/broadcast, and the second sequence of monitored media signatures 352 is collected from a second TV network/broadcast. In the illustrated example, the first sequence of monitored media signatures 350 and the second sequence of monitored media signatures 352 include blocks of signatures of configurable size (e.g., three seconds). The example first sequence of monitored media signatures 350 includes an example repeating sequence of signature blocks 354, and the example second sequence of monitored media signatures 352 includes an example sequence of signature blocks 356. In the illustrated example, the sequence of signature blocks 354 and the sequence of signature blocks 356 are the same. In such examples, the sequence of signature blocks 356 is a repeat of the sequence of signature blocks 354. In such examples, the sequence of signature blocks 354 and the sequence of signature blocks 356 are identified as an example advertisement 358.

In some examples, the advertisement 358 is not exactly aligned in the configurable sized boundaries (e.g., three second boundaries). In such examples, the example first sequence of monitored media signatures 350 and the example second sequence of monitored media signatures 352 can include signatures from a different advertisement or media content. Examples disclosed herein use the comparison of the example first sequence of monitored media signatures 350 and the example second sequence of monitored media signatures 352 to determine non-repetitive blocks of signatures and to identify only the sequence of signature blocks 354 and the sequence of signature blocks 356. In the illustrated example, the comparison of the first sequence of monitored media signatures 350 and the second sequence of monitored media signatures 352 determines an example first non-repetitive block of signatures 360, an example second non-repetitive block of signatures 362, an example third non-repetitive block of signatures 364, and an example fourth non-repetitive block of signatures 366. Based on the comparison, an example start boundary 368 and an example end boundary 370 are determined for the advertisement 358 to exclude the first non-repetitive block of signatures 360, the second non-repetitive block of signatures 362, the third non-repetitive block of signatures 364, and the fourth non-repetitive block of signatures 366.

Figure 4:
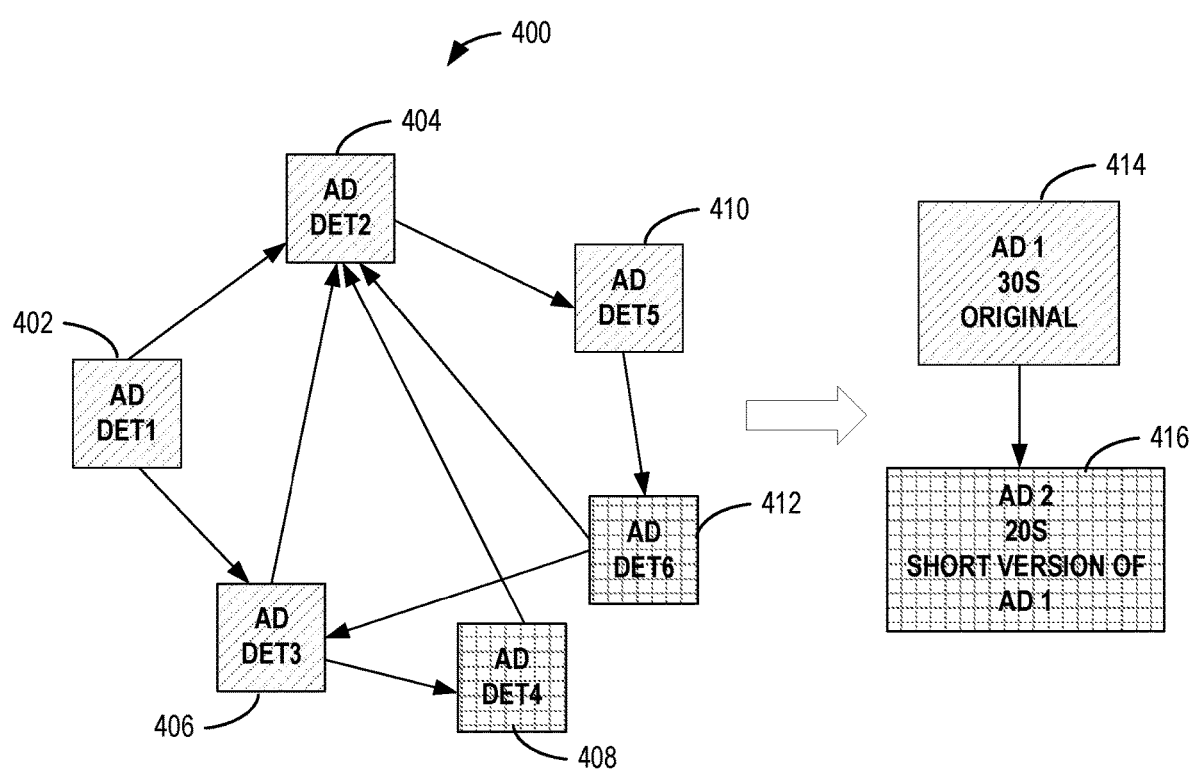
FIG. 4 is a schematic illustration of an example advertisement relationship graph in accordance with the teachings of this disclosure.

FIG. 4 is a schematic illustration of an example advertisement relationship graph 400 in accordance with the teachings of this disclosure. In the illustrated example, the advertisement relationship graph 400 includes an example first advertisement boundary 402, an example second advertisement boundary 404, an example third advertisement boundary 406, an example fourth advertisement boundary 408, an example fifth advertisement boundary 410, and an example sixth advertisement boundary 412. In some examples, advertisements are not exactly aligned across TV networks/broadcasts. In other examples, the alignment of an advertisement can be detected inaccurately. In such examples, the reference database (e.g., the example reference database 112 of FIG. 1) maintains multiple advertisements with different boundaries. For example, the example advertisement pattern identification circuitry 206 of FIG. 2 determines variations of the advertisement (e.g., the first advertisement boundary 402, the second advertisement boundary 404, the third advertisement boundary 406, the fourth advertisement boundary 408, the fifth advertisement boundary 410, and the sixth advertisement boundary 412) where monitored media signatures may match parts of different size and offsets of the variations of the advertisement.

In the illustrated example of FIG. 4, the example advertisement relationship graph 400 is formed to account for monitored media signatures matching with different advertisements in the reference database 112 (e.g., for the full amount of the advertisement, partial detection for a similar advertisement, inaccurate detection with a similar advertisement, etc.). The example advertisement relationship graph 400 is formed to allow for several detections (e.g., the first advertisement boundary 402, the second advertisement boundary 404, the third advertisement boundary 406, the fourth advertisement boundary 408, the fifth advertisement boundary 410, and the sixth advertisement boundary 412) to be considered the same advertisement. In the illustrated example, the advertisement relationship graph 400 resolves any inaccurate detections and improve boundary detection for the advertisements. Additionally, the advertisement relationship graph 400 is indicative of whether advertisement detections are similar in content with small variances. For example, an example first advertisement 414 is an advertisement at the original length of 30 seconds, and an example second advertisement 416 is the advertisement of the first advertisement 414 at a shorten length of 20 seconds. In such examples, the advertisement relationship graph 400 maps the first advertisement 414 and the second advertisement 416 as representative of the same advertisement. In some examples, the advertisement relationship graph 400 also determines similarities in advertisements that have been modified to include discrepancies to target a specific advertisement campaign.

Figure 5A:
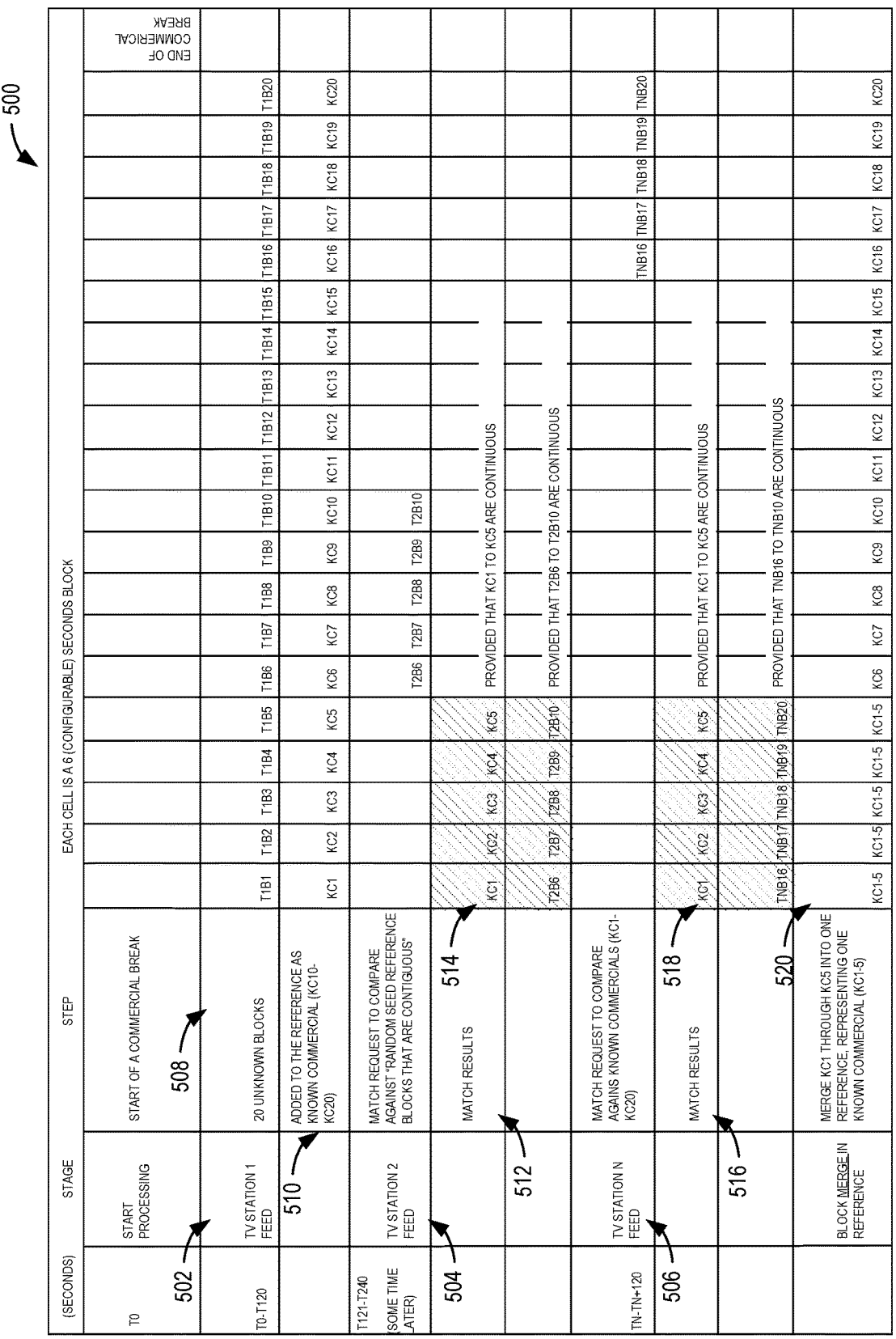
Figure 5B:
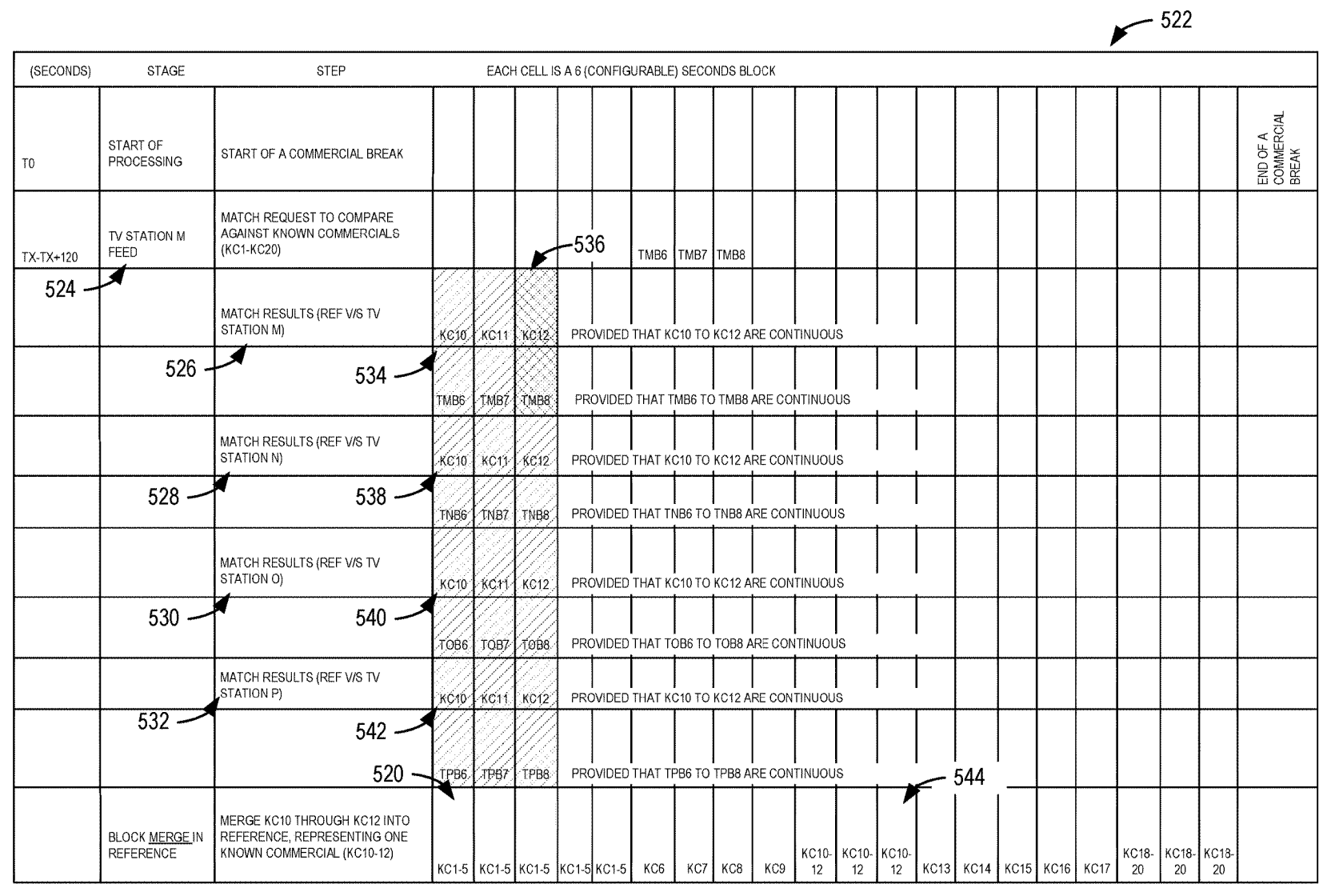
Figure 5C:
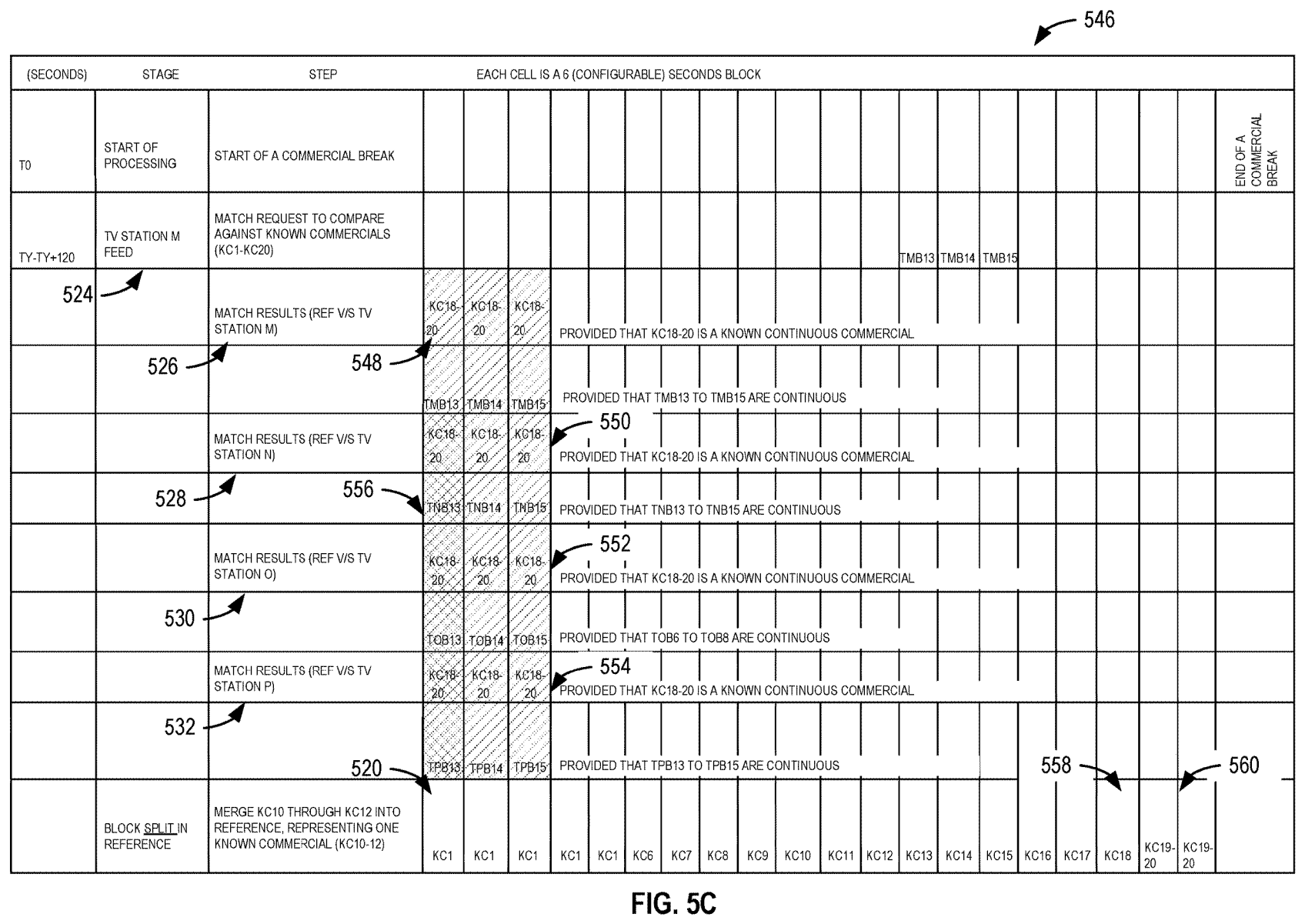

FIGS. 5A-5C are illustrations of example tables that demonstrate identifying advertisements from unknown blocks of signatures in an example commercial break of a media broadcast. FIG. 5A illustrates an example table 500 that demonstrates identifying an individual advertisement in a commercial break. The example table 500 includes an example first TV station broadcast 502, an example second TV station broadcast 504, and an example third TV station broadcast 506. The example table 500 includes three different TV station broadcasts. However, examples disclosed herein can include any number of TV station broadcasts. In the illustrated example of FIG. 5A, the first TV station broadcast 502 is associated with example unknown signature blocks 508 (e.g., T1B1, T1B2, T1B3, etc.) between the start and end of a commercial break. In the illustrated example, the first TV station broadcast 502 include 20 unknown signature blocks 508, however, the first TV station broadcast 502 can include any number of unknown signature blocks 508. In the illustrated example, the unknown signature blocks 508 are added as signature blocks of a candidate advertisement 510 (e.g., KC1, KC2, KC3, etc.) for comparison with other TV station broadcasts.

In the illustrated example of FIG. 5A, the example second TV station broadcast 504 is associated with example signature blocks between the start and end of the commercial break (e.g., T2B6, T2B7, T2B8, etc.). The signature blocks of the second TV station broadcast 504 and the signature blocks of the candidate advertisement 510 are compared to determine example matching results 512. In the illustrated example, example signature matches 514 (illustrated with shading in the figure) are determined between a portion of the signature blocks of the candidate advertisement 510 (e.g., KC1, KC2, KC3, KC4, and KC5) and a portion the signature blocks of the second TV station broadcast 504 (e.g., T2B6, T2B7, T2B8, T2B9, and T2B10). In the example table 500, the example third TV station broadcast 506 is associated with example signature blocks between the start and end of the commercial break (e.g., TNB16, TNB17, TNB18, etc.). The signature blocks of the third TV station broadcast 506 and the signature blocks of the candidate advertisement 510 are compared to determine example matching results 516. In the illustrated example, example signature matches 518 (illustrated with shading in the figure) are determined between a portion of the signature blocks of the candidate advertisement 510 (e.g., KC1, KC2, KC3, KC4, and KC5) and a portion of the signature blocks of the third TV station broadcast 506 (e.g., TNB16, TNB17, TNB18, TNB19, and TNB20). In the illustrated example of FIG. 5A, the same selection of the signature blocks of the candidate advertisement 510 (e.g., KC1, KC2, KC3, KC4, and KC5) are determined to match the signature blocks of both the second TV station broadcast 504 (e.g., T2B6, T2B7, T2B8, T2B9, and T2B10) and the third TV station broadcast 506 (e.g., TNB16, TNB17, TNB18, TNB19, and TNB20). Based on the matching results 512 and the matching results 516, the portion of the signature blocks of the candidate advertisement 510 (e.g., KC1, KC2, KC3, KC4, and KC5) are merged (e.g., combined) to represent an example reference advertisement 520. In the illustrated example, the reference advertisement 520 is determined based on the repetitive sequences of signatures blocks between the first TV station broadcast 502, the second TV station broadcast 504, and the third TV station broadcast 506.

FIG. 5B illustrates an example table 522 that demonstrates identifying additional individual advertisements included in the signature blocks of the candidate advertisement 510 in a commercial break from the first TV station broadcast 502. The example table 522 includes example additional TV station broadcasts 524 to compare to the signature blocks of the candidate advertisement 510 (e.g., KC1, KC2, KC3, etc.). The example additional TV station broadcasts 524 includes an example fourth TV station broadcast 526, an example fifth TV station broadcast 528, an example sixth TV station broadcast 530, and an example seventh TV station broadcast 532.

In the illustrated example, the signature blocks of the fourth TV station broadcast 526 and the signature blocks of the candidate advertisement 510 are compared to determine example matching results 534. In the illustrated example, example signature matches are determined between a selection of the signature blocks of the candidate advertisement 510 (e.g., KC10 and KC11) and the signature blocks of the fourth TV station broadcast 526 (e.g., TMB6 and TMB7). In some examples, not all of the signature blocks match between the candidate advertisement 510 and the TV station broadcast (e.g., the fourth TV station broadcast 526). For example, example non-matching results 536 represent that the signature block KC12 of the candidate advertisement 510 and the signature block TMB8 of the fourth TV station broadcast 526 do not match. In the example table 522, the signature blocks of the fifth TV station broadcast 528 and the signature blocks of the candidate advertisement 510 are compared to determine example matching results 538. In the illustrated example, example signature matches are determined between the same selection of the signature blocks of the candidate advertisement 510 (e.g., KC10, KC11, and KC12) and the signature blocks of the fifth TV station broadcast 528 (e.g., TNB6, TNB7, and TNB8). In the illustrated example, the signature blocks of the sixth TV station broadcast 530 and the signature blocks of the candidate advertisement 510 are compared to determine example matching results 540. In the illustrated example, example signature matches are determined between the same selection of the signature blocks of the candidate advertisement 510 (e.g., KC10, KC11, and KC12) and the signature blocks of the sixth TV station broadcast 530 (e.g., TOB6, TOB7, and TOB8). In the illustrated example, the signature blocks of the seventh TV station broadcast 532 and the signature blocks of the candidate advertisement 510 are compared to determine example matching results 542. In the illustrated example, example signature matches are determined between the same selection of the signature blocks of the candidate advertisement 510 (e.g., KC10, KC11, and KC12) and the signature blocks of the seventh TV station broadcast 532 (e.g., TPB6, TPB7, and TPB8).

In the illustrated example of FIG. 5B, the selection of the signature blocks of the candidate advertisement 510 (e.g., KC10, KC11, and KC12) are determined to match selections of signature blocks of the four different TV station broadcasts. Based on the matching results 534, the matching results 538, the matching results 540, and the matching results 542, the selection of the signature blocks of the candidate advertisement 510 (e.g., KC10, KC11, and KC12) are merged (e.g., combined) to represent an example reference advertisement 544. In the illustrated example, the reference advertisement 544 is determined based on the repetitive sequences of signature blocks between the first TV station broadcast 502, the fourth TV station broadcast 526, the fifth TV station broadcast 528, the sixth TV station broadcast 530, and the seventh TV station broadcast 532.

FIG. 5C illustrates an example table 546 that demonstrates identifying additional individual advertisements included in the signature blocks of the candidate advertisement 510 by splitting (e.g., removing) previously merged/combined signature blocks (e.g., KC18-20 of the candidate advertisement 510) based on data from additional TV station broadcasts. The example table 546 includes the example additional TV station broadcasts 524 to compare to the signature blocks of the candidate advertisement 510 (e.g., KC1, KC2, KC3, etc.). The example additional TV station broadcasts 524 includes the fourth TV station broadcast 526, the fifth TV station broadcast 528, the sixth TV station broadcast 530, and the seventh TV station broadcast 532.

In the illustrated example, the signature blocks of the fourth TV station broadcast 526 and the signature blocks of the candidate advertisement 510 are compared to determine example matching results 548. In the illustrated example, example signature matches are determined between a selection of the signature blocks of the candidate advertisement 510 (e.g., KC18-20) and the signature blocks of the fourth TV station broadcast 526 (e.g., TMB13, TMB14, and TMB15). In the example table 522, the signature blocks of the fifth TV station broadcast 528 and the signature blocks of the candidate advertisement 510 are compared to determine example matching results 550. In the illustrated example, example signature matches are determined between the same selection of the signature blocks of the candidate advertisement 510 (e.g., KC18-20) and the signature blocks of the fifth TV station broadcast 528 (e.g., TNB14 and TNB15). In the illustrated example, the signature blocks of the sixth TV station broadcast 530 and the signature blocks of the candidate advertisement 510 are compared to determine example matching results 552. In the illustrated example, example signature matches are determined between the same selection of the signature blocks of the candidate advertisement 510 (e.g., KC18-20) and the signature blocks of the sixth TV station broadcast 530 (e.g., TOB14 and TOB15). In the illustrated example, the signature blocks of the seventh TV station broadcast 532 and the signature blocks of the candidate advertisement 510 are compared to determine example matching results 554. In the illustrated example, example signature matches are determined between the same selection of the signature blocks of the candidate advertisement 510 (e.g., KC18-20) and the signature blocks of the seventh TV station broadcast 532 (e.g., TPB14 and TPB15).

In some examples, not all of the signature blocks match between the candidate advertisement 510 and the TV station broadcasts (e.g., the fifth TV station broadcast 528, the sixth TV station broadcast 530, and the seventh TV station broadcast 532). For example, example non-matching results 556 represent that the signature blocks KC18-20 of the candidate advertisement 510 and the signature blocks TNB13, TOB13, and TPB13 of the fifth TV station broadcast 528, the sixth TV station broadcast 530, and the seventh TV station broadcast 532, respectively, do not match. In such examples, the selection of the signature blocks of the candidate advertisement 510 that were previously merged as one advertisement (e.g., KC18-20) are determined to not match the selections signature blocks of the four different TV station broadcasts. Based on the matching results 548, the matching results 550, the matching results 552, the matching results 554, and the non-matching results 556, the selection of the signature blocks of the candidate advertisement 510 (e.g., KC18-20) are split, where KC18 of the candidate advertisement 510 is split to represent an example reference advertisement 558 and KC19-20 of the candidate advertisement 510 are split to represent an example reference advertisement 560. In the illustrated example, the reference advertisement 558 and the reference advertisement 560 are determined based on the repetitive sequences of signature blocks and the non-repetitive sequences of signature blocks between the first TV station broadcast 502, the fourth TV station broadcast 526, the fifth TV station broadcast 528, the sixth TV station broadcast 530, and the seventh TV station broadcast 532.

While an example manner of implementing the example advertisement analysis circuitry 114 of FIG. 1 is illustrated in FIG. 2, one or more of the elements, processes, and/or devices illustrated in FIG. 2 may be combined, divided, re-arranged, omitted, eliminated, and/or implemented in any other way. Further, the example meter data analysis circuitry 110, the example advertisement analysis circuitry 114, the example media exposure creditor circuitry 116, the example reference database interface 202, the example signature comparison circuitry 204, the example advertisement pattern identification circuitry 206, the example relationship graph generation circuitry 208, and/or, more generally, the example data center 108 of FIG. 1, may be implemented by hardware alone or by hardware in combination with software and/or firmware. Thus, for example, any of the example meter data analysis circuitry 110, the example advertisement analysis circuitry 114, the example media exposure creditor circuitry 116, the example reference database interface 202, the example signature comparison circuitry 204, the example advertisement pattern identification circuitry 206, the example relationship graph generation circuitry 208 and/or, more generally, the example data center 108, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC (s)), programmable logic device(s) (PLD(s)), and/or field programmable logic device(s) (FPLD(s)) such as Field Programmable Gate Arrays (FPGAs). Further still, the example advertisement analysis circuitry 114 of FIG. 1 may include one or more elements, processes, and/or devices in addition to, or instead of, those illustrated in FIG. 2, and/or may include more than one of any or all of the illustrated elements, processes and devices.

Figure 6:
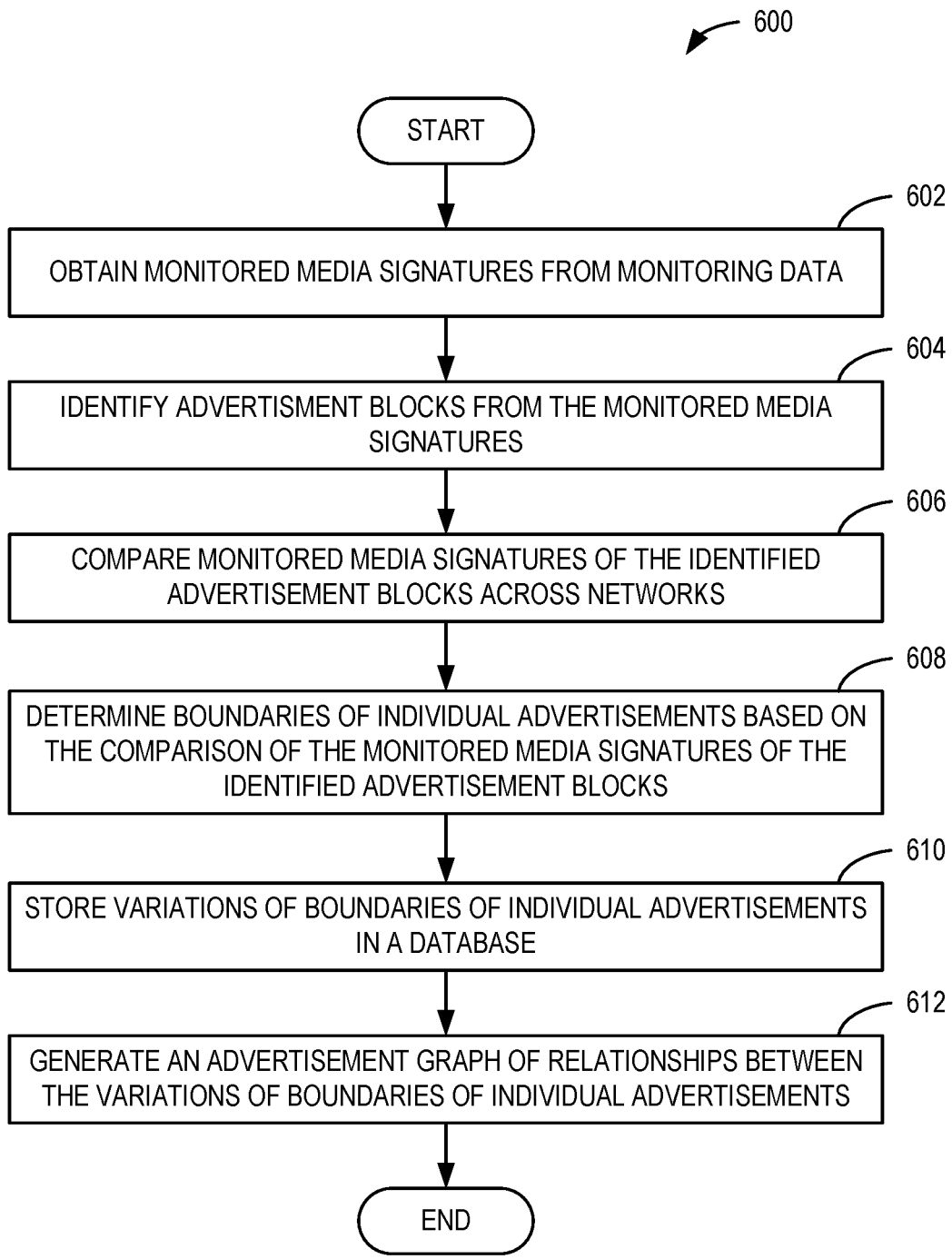
FIG. 6 is a flowchart representative of example machine readable instructions and/or example operations that may be executed by example processor circuitry to implement the advertisement analysis circuitry of FIG. 2.
Figure 7:
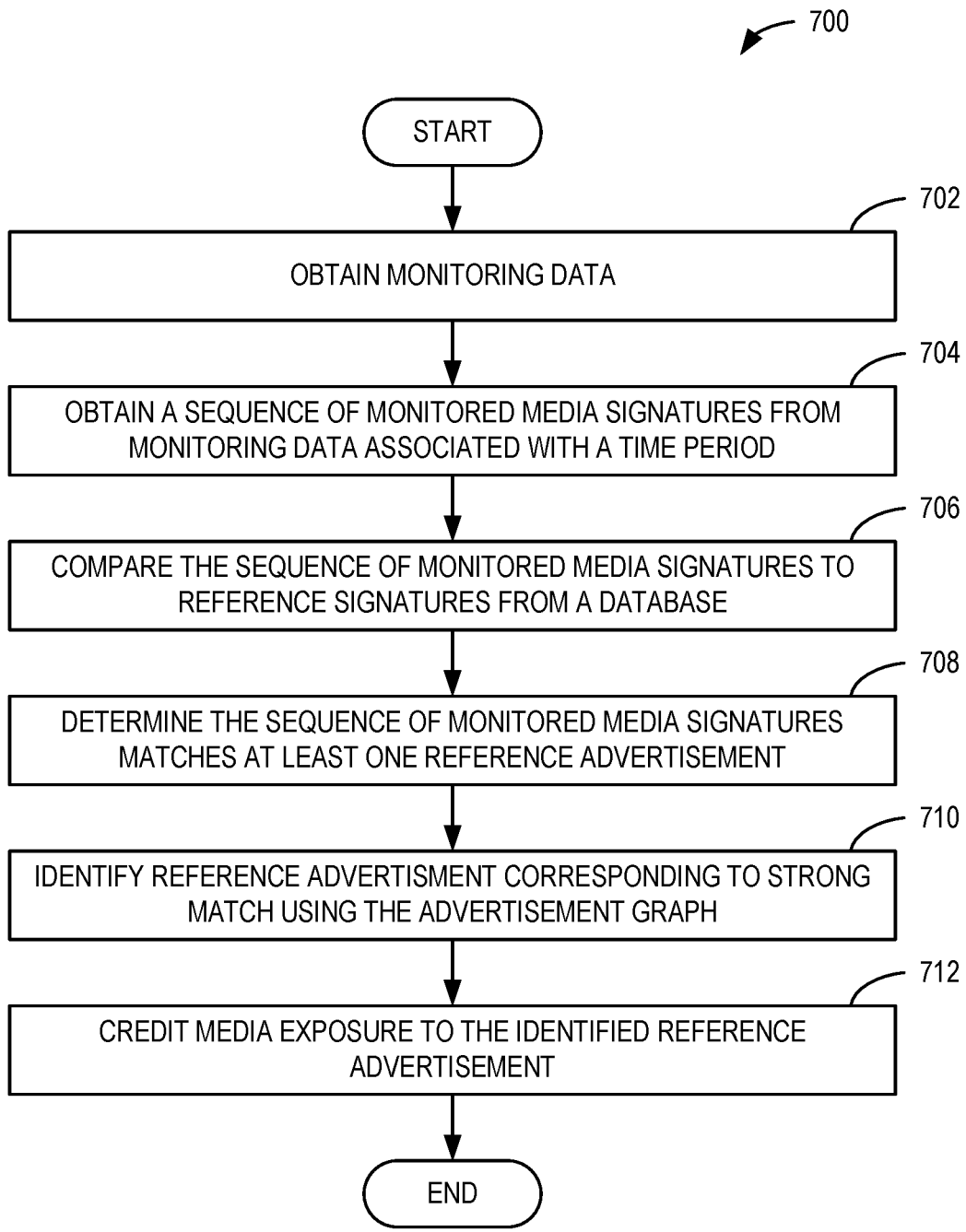
FIG. 7 is a flowchart representative of example machine readable instructions and/or example operations that may be executed by example processor circuitry to implement example meter data analysis circuitry and example media exposure creditor circuitry of FIG. 1.

Flowcharts representative of example hardware logic circuitry, machine readable instructions, hardware implemented state machines, and/or any combination thereof for implementing the example data center 108 of FIG. 1 are shown in FIGS. 6 and 7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The programs may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire programs and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example programs are described with reference to the flowcharts illustrated in FIGS. 6 and 7, many other methods of implementing the example data center 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 6 and 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed and/or instantiated by processor circuitry to identify individual advertisements included in commercial breaks. The machine readable instructions and/or the operations 600 of FIG. 6 begin at block 602, at which the monitored signature database interface 201 obtains monitored media signatures from monitoring data. The example reference database interface 202 obtains the monitoring data, such as the monitoring data 104A, 104B, 104C of FIG. 1, from media meters, such as the meters 102A, 102B, 102C of FIG. 1, collected by the example meter data analysis circuitry 110 of FIG. 1. In some examples, the reference database interface 202 obtains blocks of monitored media signatures from the example monitoring data 104A, 104B, 104C. In some examples, the example monitoring data 104A, 104B, 104C is already identified via one or more commercial break detection techniques as representative of commercial breaks across different TV stations/broadcasts. For example, the monitoring data 104A includes monitored media signatures associated with a commercial break on a first TV station (e.g., ABC), and the monitoring data 104B includes monitored media signatures associated with a commercial break on a second TV station (e.g., NBC). In some examples, the example reference database interface 202 also obtains reference signatures from the example reference database 112 of FIG. 1.

At block 604, the example signature comparison circuitry 204 identifies advertisement blocks from the monitored media signatures. In some examples, the signature comparison circuitry 204 identifies advertisement blocks from the monitored media signatures obtained by the example reference database interface 202. In some examples, the signature comparison circuitry 204 obtains the monitored media signatures from the reference database interface 202 and parses the monitored media signatures into blocks of configurable size (e.g., three seconds, five seconds, etc.).

At block 606, the example signature comparison circuitry 204 compares monitored media signatures of the identified advertisement blocks across networks. In some examples, the signature comparison circuitry 204 compares the monitored media signatures of the identified advertisement blocks from the different monitoring data 104A, 104B, 104C across the different monitored TV networks/broadcasts. For example, the signature comparison circuitry 204 compares monitored media signatures associated with an advertisement block from first monitoring data (e.g., monitoring data 104A) associated with a time period to monitored media signatures that are associated with advertisement blocks from additional monitoring data (e.g., monitoring data 104B, 104C) received during the time period.

At block 608, the example advertisement pattern identification circuitry 206 determines boundaries of individual advertisements based on the comparison of the monitored media signatures of the identified advertisement blocks. In some examples, advertisement pattern identification circuitry 206 determines the boundaries of individual advertisements based on the comparison of monitored media signatures of the identified advertisement blocks. The example advertisement pattern identification circuitry 206 determines a start boundary and an end boundary of an individual advertisement from the advertisement blocks based on the comparison of the different sequences monitored media signatures from the monitoring data 104A, 104B, 104C. In some examples, the advertisement pattern identification circuitry 206 identifies the individual advertisement by identifying a repeating sequence of monitored media signatures included in the different sequences of monitored media signatures included in the respective monitoring data 104A, 104B, 104C.

In some examples, the advertisement pattern identification circuitry 206 creates a graph of similarity score relationships (e.g., a similarity graph) between unknown advertisement blocks to unknown advertisement blocks of monitored media signatures (e.g., advertisement blocks including monitored media signatures not identified in the reference signatures of the reference database 112) and unknown advertisement blocks to known advertisement blocks of monitored media signatures (e.g., advertisement blocks including monitored media signatures identified in the reference signatures of the reference database 112) appearing during the commercial break across different TV stations/broadcasts (e.g., the different monitoring data 104A, 104B, 104C). For example, the advertisement pattern identification circuitry 206 compares the monitored media signatures included in the advertisement blocks from the monitoring data 104A, 104B, 104C and compares the monitored media signatures included in the advertisement blocks to reference signatures blocks of configurable size (e.g., three second, five seconds, etc.) to determine similarity scores. In such examples, a similarity score is representative of a number of matching signatures between the compared blocks of signatures (e.g., between monitored media signatures of different advertisement blocks and/or between monitored media signatures and the reference signatures from the example reference database 112). In some examples, the advertisement pattern identification circuitry 206 generates the similarity graph of relationships of the similarities between the monitored media signatures of the different advertisement blocks. The example advertisement pattern identification circuitry 206 traverses the similarity graph to generate a contiguous sequence of advertisement blocks with high similarity scores. In some examples, a high similarity score is determined using a threshold (e.g., a number of signature matches). For example, two advertisement blocks have a high similarity score when the number of signature matches meets or exceeds a similarity threshold. In some examples, advertisement blocks having a high similarity score indicates the monitored media signatures included in the advertisement blocks were repeated in the sequences of monitored media signatures of the monitoring data 104A, 104B, 104C. In some examples, the advertisement pattern identification circuitry 206 generates independent branches in the similarity graph that are representative of different contiguous sequences of advertisement blocks with high similarity scores. The example advertisement pattern identification circuitry 206 identifies an individual advertisement based on the contiguous sequences of advertisement blocks with high similarity scores.

In some examples, the advertisement pattern identification circuitry 206 determines the start boundary and end boundary of an individual advertisement based on the consecutive sequences of monitored media signatures in the contiguous sequences of advertisement blocks determined to have high similarity scores. The example advertisement pattern identification circuitry 206 determines the start boundary of the individual advertisement as the first monitored media signature in the group of consecutive sequences of monitored media signatures. The example advertisement pattern identification circuitry 206 determines the end boundary of the individual advertisement as the last monitored media signature in the group of consecutive sequences of monitored media signatures. In some examples, the advertisement pattern identification circuitry 206 defines the individual advertisement as the sequence of monitored media signatures between the start boundary and the end boundary. In some examples, the advertisement pattern identification circuitry 206 stores the sequence of monitored media signatures as reference signatures associated with the individual advertisement in the reference database 112.

In some examples, the advertisement pattern identification circuitry 206 determines variations of the boundaries of individual advertisements. In some examples, the advertisement pattern identification circuitry 206 may determine different start boundaries and different end boundaries for an individual advertisement based on variation of the individual advertisement across different TV networks/broadcasts. For example, an advertisement may be modified from its original version on different TV networks/broadcasts (e.g., the advertisement may be shorted in time, the advertisement may be modified to target a particular audience, etc.). In some examples, these variations of the individual advertisement are represented as other independent branches in the similarity graph that include high similarity scores in relation to the branch of the individual advertisement. In some examples, the advertisement pattern identification circuitry 206 continuously merges and splits advertisement blocks as time progresses to correct boundaries of known individual advertisements.

At block 610, the example relationship graph generation circuitry 208 stores variations of boundaries of individual advertisements in the reference database 112 of FIG. 1. At block 612, the example relationship graph generation circuitry 208 generates an advertisement relationship graph of relationships between the variations of boundaries of individual advertisements. In some examples, the relationship graph generation circuitry 208 generates an entry in the advertisement relationship graph for a sequence of monitored media signatures to map the sequence of monitored media signatures to an individual advertisement in the advertisement relationship graph to be used to credit media exposure to the individual advertisement. The example relationship graph generation circuitry 208 generates an advertisement relationship graph based on the contiguous sequences of advertisement blocks included in the similarity graph from the example advertisement pattern identification circuitry 206. In some examples, the relationship graph generation circuitry 208 tags all related branches in the similarity graph as occurrences of the individual advertisement (e.g., based on the different variations in the individual advertisement across TV networks/broadcasts). In such examples, the relationship graph generation circuitry 208 maps the different sequences of signatures associated with the different contiguous sequences of advertisement blocks to the same individual advertisement to account for the variations in boundaries of the individual advertisement (e.g., a shorten version of the advertisement, a targeted version of the advertisement to a specific audience, etc.). In some examples, the relationship graph generation circuitry 208 stores the sequences of signatures included in the variations of boundaries of the individual advertisements along with the advertisement relationship graph in the reference database 112 to be accessed by the example media exposure creditor circuitry 116 to use to credit media exposure to the individual advertisement. For example, the advertisement relationship graph associates the different sequences of signatures with the individual advertisement, and the media exposure creditor circuitry 116 credits the media exposure to the individual advertisement when the collected monitored media signatures match any one of the different sequences of signatures mapped to the individual advertisement. After block 612 completes, process 600 ends.

FIG. 7 is a flowchart representative of example machine readable instructions and/or example operations 700 that may be executed and/or instantiated by processor circuitry to credit media exposure to identified, individual advertisements. The machine readable instructions and/or the operations 700 of FIG. 7 begin at block 702, at which the example meter data analysis circuitry 110 obtains monitoring data. In some examples, the meter data analysis circuitry 110 collects the monitoring data such as the monitoring data 104A, 104B, 104C of FIG. 1, from the media meters, such as the meters 102A, 102B, 102C of FIG. 1, via the example network 106. In some examples, the meter data analysis circuitry 110 can convert the monitoring data 104A, 104B, 104C into a format readable by the meter data analysis circuitry 110. In some examples, the meter data analysis circuitry 110 can be in continuous communication with the network 106, the first media meter 102A, the second media meter 102B and/or the third media meter 102C. In other examples, the meter data analysis circuitry 110 can be in intermittent (e.g., periodic or aperiodic) communication with the network 106, the first media meter 102A, the second media meter 102B and/or the third media meter 102C. The remainder of the process 700 of FIG. 7 is described with reference to the monitoring data 104A. However, the process 700 is also applicable to any other monitoring data described in this disclosure (e.g., the monitoring data 104B, 104C, etc.). At block 704, the example meter data analysis circuitry 110 obtains a sequence of monitored media signatures from the monitoring data 104A associated with a time period (e.g., 30 seconds, five minutes, etc.).

At block 706, the example meter data analysis circuitry 110 compares the sequence of monitored media signatures to reference signatures from a database. In some examples, the meter data analysis circuitry 110 compares the sequence of monitored media signatures in the example monitoring data 104A, 104B, 104C to the reference signatures in the example reference database 112 to identify media assets associated with monitoring data 104A, 104B, 104C. For example, the meter data analysis circuitry 110 can determine if the sequence of monitored media signatures match any reference signatures stored in the reference database 112. In some examples, some or all of the signatures in the sequence of monitored media signatures can match with corresponding reference signatures in the reference database 112 that represent a reference media asset (e.g., reference signatures associated with a reference advertisement, etc.). At block 708, the example meter data analysis circuitry 110 determines the sequence of monitored media signatures matches at least one reference advertisement determined by the example advertisement analysis circuitry 114 of FIG. 1.

At block 710, the example meter data analysis circuitry 110 identifies a reference advertisement corresponding to a strong match using the advertisement graph. In some examples, the meter data analysis circuitry 110 determines strong matches between the sequence of monitored media signatures to the reference signatures to identify a reference media asset. As used herein, a "strong match" is based on the number of signature matches that occur within the time period. For example, a strong match can correspond to relatively high number of signature matches in a period of time (e.g., one signature match per second, five signature matches per second, etc.). However, any other suitable number of signature matches in the time period can correspond to strong matching. In some examples, the meter data analysis circuitry 110 identifies a reference advertisement corresponding to a strong match using the advertisement relationship graph from the example advertisement analysis circuitry 114. In such examples, the example meter data analysis circuitry 110 identifies a strong match between the sequence of monitored media signatures to a sequence of reference signatures that are mapped to a reference advertisement included in the advertisement relationship graph.

At block 712, the example media exposure creditor circuitry 116 credits the media exposure to the identified reference advertisement. In some examples, the media exposure creditor circuitry 116 uses identification data associated with the reference media assets (e.g., reference advertisement) identified by the meter data analysis circuitry 110 to credit the media exposure of the reference media assets to user(s) associated with the media meters 102A, 102B, 102C. In some examples, the media exposure creditor circuitry 116 credits the media exposure to the reference media asset associated with reference data (e.g., reference signature, reference watermarks, etc.) determined to match the monitored media data (e.g., monitored media signatures, etc.). In some examples, the media exposure creditor circuitry 116 credits the media exposure to the identified reference advertisement associated with the reference signatures determined to match the sequence of monitored media signatures from the meter data analysis circuitry 110. In some examples, the media exposure creditor circuitry 116 credits the media exposure to the reference advertisement associated with a sequence of reference signatures mapped to the reference advertisement in the advertisement relationship graph from the example advertisement analysis circuitry 114. In such examples, the media exposure creditor circuitry 116 credits the media exposure to the reference advertisement mapped to the reference signatures determined to match the sequence of monitored media signatures by the meter data analysis circuitry 110. After block 712 completes, process 700 ends.

Figure 8:
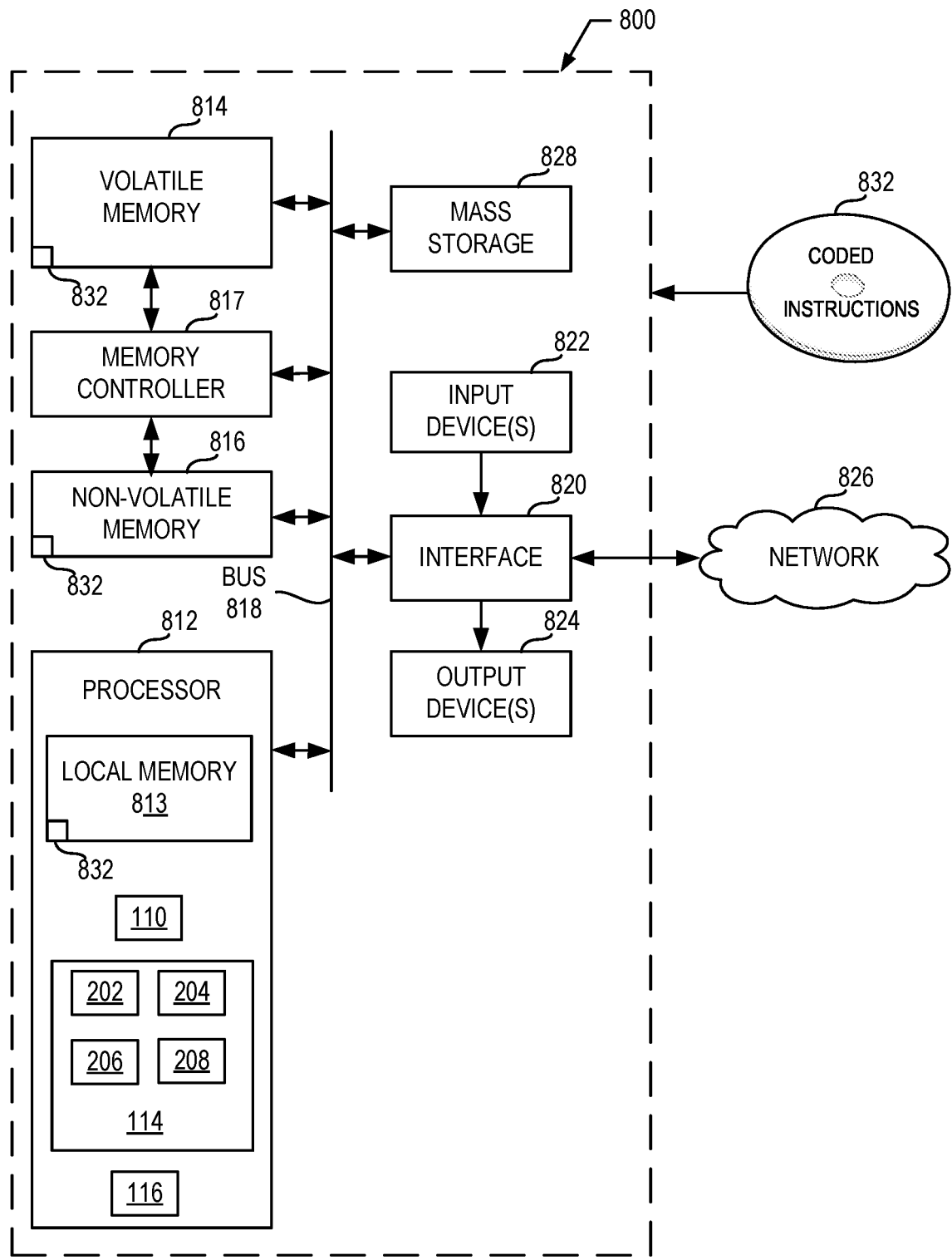
FIG. 8 is a block diagram of an example processing platform including processor circuitry structured to execute the example machine readable instructions and/or the example operations of FIGS. 6 and 7 to implement the example data center of FIG. 1.

FIG. 8 is a block diagram of an example processor platform 800 structured to execute and/or instantiate the machine readable instructions and/or the operations of FIGS. 6 and 7 to implement the example data center 108 of FIG. 8. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs, microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example meter data analysis circuitry 110, the example advertisement analysis circuitry 114, the example media exposure creditor circuitry 116, the example reference database interface 202, the example signature comparison circuitry 204, the example advertisement pattern identification circuitry 206, and the example relationship graph generation circuitry 208.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 832, which may be implemented by the machine readable instructions of FIGS. 6 and 7, may be stored in the mass storage device 828, in the volatile memory 814, in the non-volatile memory 816, and/or on a removable non-transitory computer readable storage medium such as a CD or DVD.

Figure 9:
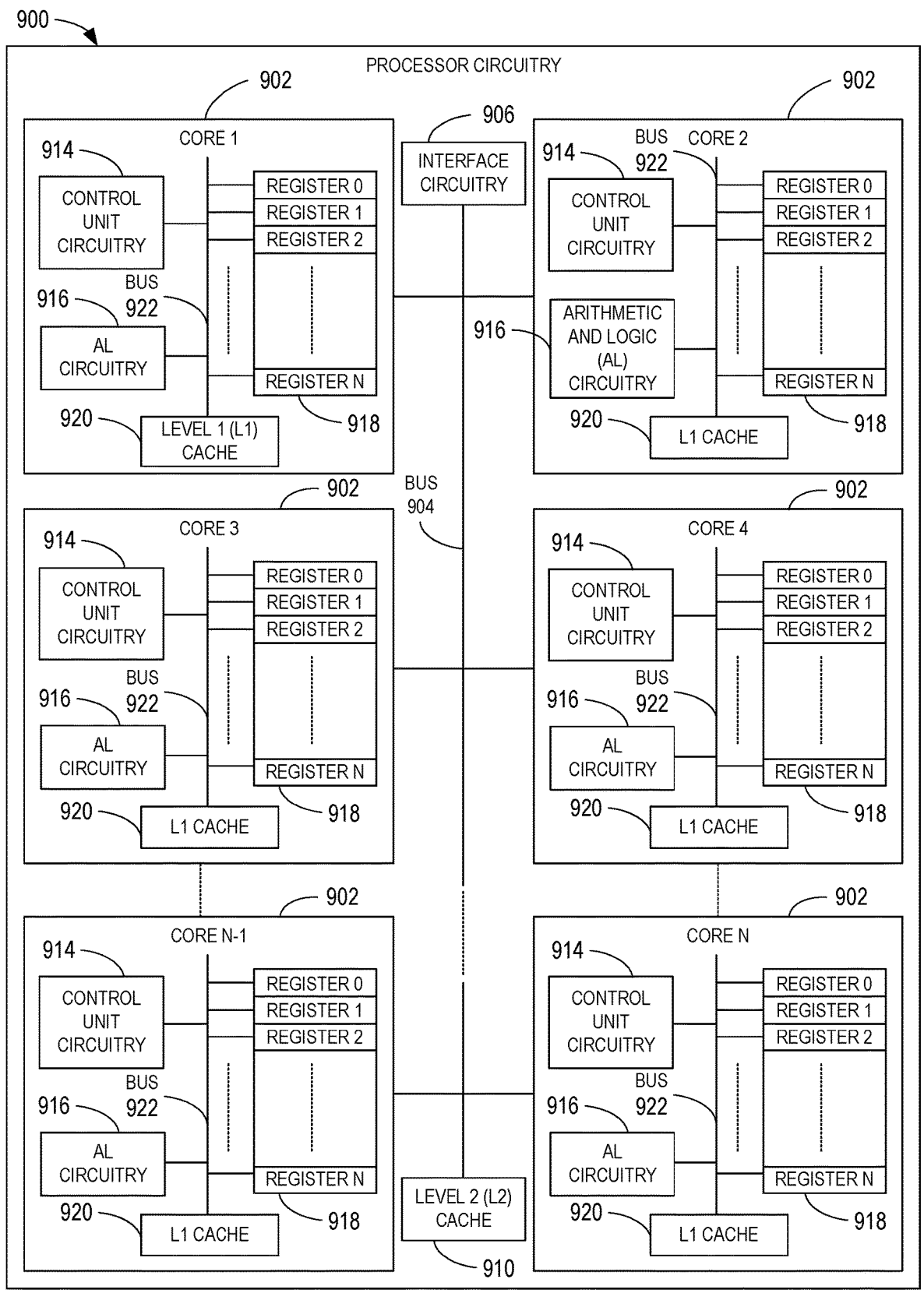
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a general purpose microprocessor 900. The general purpose microprocessor circuitry 900 executes some or all of the machine readable instructions of the flowcharts of FIGS. 6 and 7 to effectively instantiate the circuitry of FIGS. 1 and 2 as logic circuits to perform the operations corresponding to those machine readable instructions. In some such examples, the circuitry of FIGS. 1 and 2 is instantiated by the hardware circuits of the microprocessor circuitry 900 in combination with the instructions. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 6 and 7.

The cores 902 may communicate by a first example bus 904. In some examples, the first bus 904 may implement a communication bus to effectuate communication associated with one(s) of the cores 902. For example, the first bus 904 may implement at least one of an Inter-Integrated Circuit (I2C) bus, a Serial Peripheral Interface (SPI) bus, a PCI bus, or a PCIe bus. Additionally or alternatively, the first bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_ cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The second bus 922 may implement at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
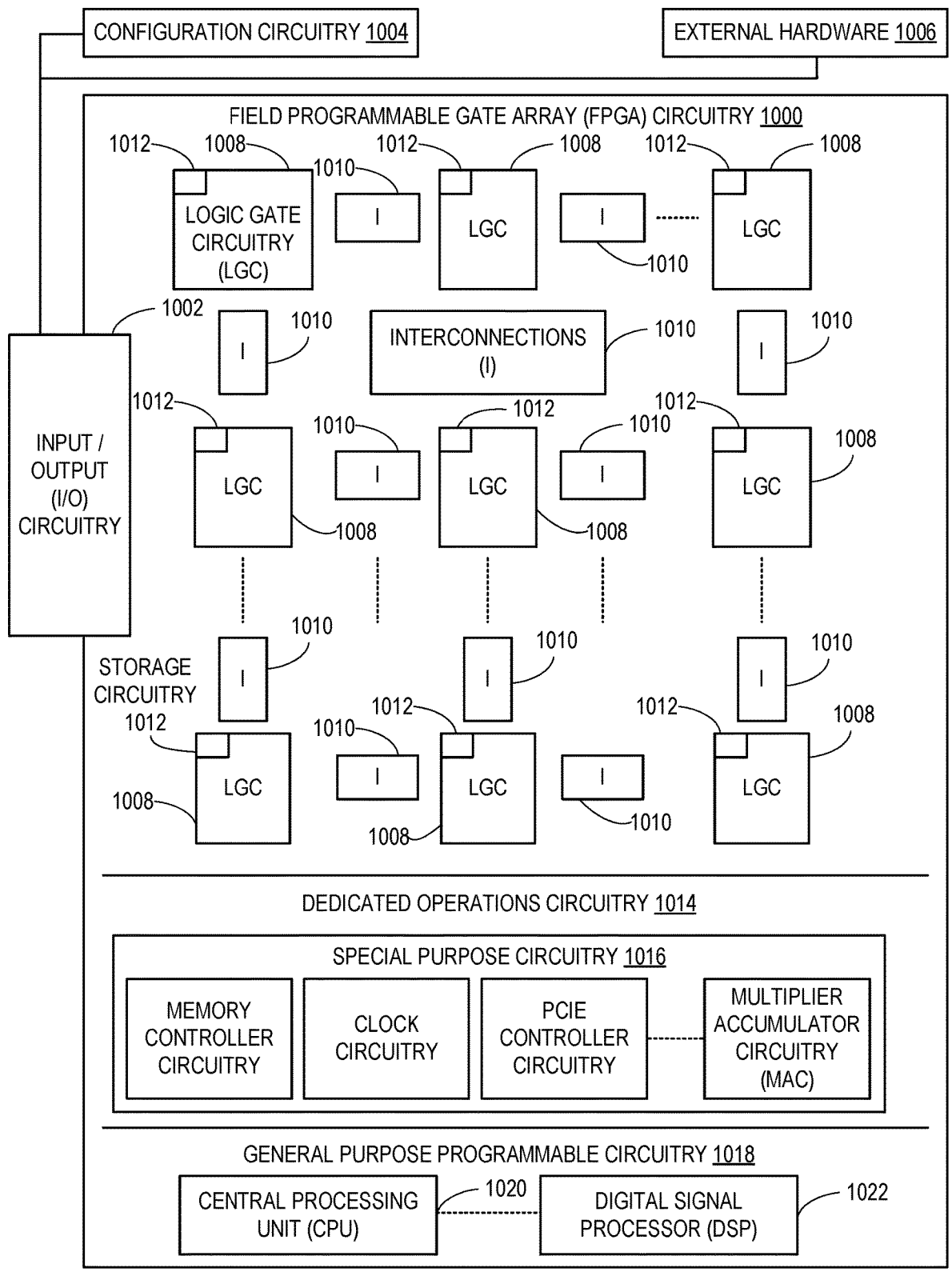
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 6 and 7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIGS. 6 and 7. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 6 and 7. As such, the FPGA circuitry 1000 may be structured to effectively instantiate some or all of the machine readable instructions of the flowcharts of FIGS. 6 and 7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 6 and 7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIGS. 6 and 7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an on-board CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 6 and 7 may be executed by one or more of the cores 902 of FIG. 9, a second portion of the machine readable instructions represented by the flowcharts of FIGS. 6 and 7 may be executed by the FPGA circuitry 1000 of FIG. 10, and/or a third portion of the machine readable instructions represented by the flowcharts of FIGS. 6 and 7 may be executed by an ASIC. It should be understood that some or all of the circuitry of FIGS. 1 and 2 may, thus, be instantiated at the same or different times. Some or all of the circuitry may be instantiated, for example, in one or more threads executing concurrently and/or in series. Moreover, in some examples, some or all of the circuitry of FIGS. 1 and 2 may be implemented within one or more virtual machines and/or containers executing on the microprocessor.

In some examples, the processor circuitry 812 of FIG. 8 may be in one or more packages. For example, the processor circuitry 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
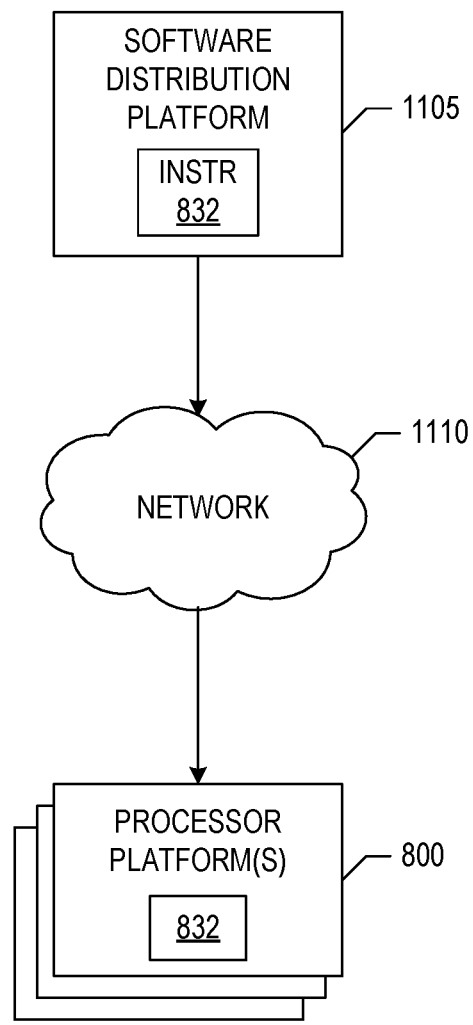
FIG. 11 is a block diagram of an example software distribution platform (e.g., one or more servers) to distribute software (e.g., software corresponding to the example machine readable instructions of FIGS. 6 and 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 832, which may correspond to the example machine readable instructions 600 of FIG. 6 and the example machine readable instructions 700 of FIG. 7, as described above. The one or more servers of the example software distribution platform 1105 are in communication with a network 1110, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions 600 of FIG. 6 and the example machine readable instructions 700 of FIG. 7, may be downloaded to the example processor platform 800, which is to execute the machine readable instructions 832 to implement the example data center 108 of FIG. 1. In some example, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices.

From the foregoing, it will be appreciated that example systems, methods, apparatus, and articles of manufacture have been disclosed that allow for optimization of reference signature matching for advertisements. The disclosed methods, apparatus and articles of manufacture improve the efficiency of using a computing device by reducing computational requirements of systems that identify media exposure for advertisements. The disclosed examples identify signatures representative of individual advertisements in an advertisement block which allows crediting of exposure to individual advertisements. The disclosed herein examples look at the sequences of signatures from different broadcasts of media during a period of time and identify repeating sequences of signatures from the broadcasts to determine individual advertisements. The disclosed examples identify different boundaries of start signatures and end signatures from the individual advertisements based on variations in the broadcasts. The disclosed examples generate an advertisement relationship graph to map relationship between the different boundaries of start signatures and end signatures. The disclosed examples maintain performance in the media matching process by mapping the different boundaries of start signatures and end signatures to identify the same advertisement. The disclosed methods, apparatus and articles of manufacture are accordingly directed to one or more improvement(s) in the functioning of a computer.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An audience measurement computing system comprising:
   at least one processor;
   memory having stored therein computer readable instructions that, upon execution by the at least one processor, cause the audience measurement computing system to:
   compare first monitored media signatures associated with an advertisement block to a plurality of sequences of monitored media signatures associated with a first time period;
   determine a start boundary and an end boundary of a first advertisement in the advertisement block based on the comparison of the first monitored media signatures and the plurality of sequences of monitored media signatures, the first advertisement associated with second monitored media signatures representative of a subset of the first monitored media signatures between the start boundary and the end boundary;
   generate an entry in an advertisement relationship graph for the second monitored media signatures, the entry to map the second monitored media signatures to the first advertisement; and
   credit media exposure to the first advertisement based on the second monitored media signatures in the advertisement relationship graph.

2. The audience measurement computing system of claim 1, wherein the first monitored media signatures are included in monitoring data reported by a media device meter, the media device meter to monitor media presented by a media device.

3. The audience measurement computing system of claim 1, wherein to identify the first advertisement, the instructions further cause, upon execution by the at least one processor, the audience measurement computing system to identify a sequence of monitored media signatures in the first monitored media signatures that is repeated in the plurality of sequences of monitored media signatures.

4. The audience measurement computing system of claim 1, wherein the instructions further cause, upon execution by the at least one processor, the audience measurement computing system to determine the start boundary and the end boundary of the first advertisement by:
  identifying a consecutive group of the first monitored media signatures that are repeated in the plurality of sequences of monitored media signatures;
  determining the start boundary as a first one of the first monitored media signatures in the group; and
  determining the end boundary as a last one of the first monitored media signatures in the group.

5. The audience measurement computing system of claim 1, wherein the instructions further cause, upon execution by the at least one processor, the audience measurement computing system to determine a plurality of variations of boundaries of the first advertisement corresponding to variations of the first advertisement among different broadcasts, the plurality of variations of boundaries including a plurality of start boundaries and a plurality of end boundaries.

6. The audience measurement computing system of claim 5, wherein the variations of the first advertisement include at least one of the first advertisement being shortened in time or the first advertisement being modified to target a particular audience.

7. The audience measurement computing system of claim 5, wherein the instructions further cause, upon execution by the at least one processor, the audience measurement computing system to generate the advertisement relationship graph between the plurality of variations of boundaries of the first advertisement, the advertisement relationship graph to map signatures included in the plurality of variations of boundaries as representative of the first advertisement.

8. At least one non-transitory computer readable medium comprising instructions which, when executed by at least one processor of a computing system, cause the computing system to at least:
  compare first monitored media signatures associated with an advertisement block to a plurality of sequences of monitored media signatures associated with a first time period;
  determine a start boundary and an end boundary of a first advertisement in the advertisement block based on the comparison of the first monitored media signatures and the plurality of sequences of monitored media signatures, the first advertisement associated with second monitored media signatures representative of a subset of the first monitored media signatures between the start boundary and the end boundary;
  generate an entry in an advertisement relationship graph for the second monitored media signatures, the entry to map the second monitored media signatures to the first advertisement; and
  credit media exposure to the first advertisement based on the second monitored media signatures in the advertisement relationship graph.

9. The at least one non-transitory computer readable medium of claim 8, wherein the first monitored media signatures are included in monitoring data reported by a media device meter, the media device meter to monitor media presented by a media device.

10. The at least one non-transitory computer readable medium of claim 8, wherein the instructions further cause, when executed by the at least one processor, the computing system to identify the first advertisement by identifying a sequence of monitored media signatures included in the first monitored media signatures that is repeated in the plurality of sequences of monitored media signatures.

11. The at least one non-transitory computer readable medium of claim 8, wherein the instructions further cause, when executed by the at least one processor, the computing system to determine the start boundary and the end boundary of the first advertisement by:
  identifying a consecutive group of the first monitored media signatures that are repeated in the plurality of sequences of monitored media signatures;
  determining the start boundary as a first one of the first monitored media signatures in the group; and
  determining the end boundary as a last one of the first monitored media signatures in the group.

12. The at least one non-transitory computer readable medium of claim 8, wherein the instructions further cause, when executed by the at least one processor, the computing system to determine a plurality of variations of boundaries of the first advertisement corresponding to variations of the first advertisement among different broadcasts, the plurality of variations of boundaries including a plurality of start boundaries and a plurality of end boundaries.

13. The at least one non-transitory computer readable medium of claim 12, wherein the instructions further cause, when executed by the at least one processor, the computing system to generate the advertisement relationship graph between the plurality of variations of boundaries of the first advertisement, the advertisement relationship graph to map signatures included in the plurality of variations of boundaries as representative of the first advertisement.

14. A method comprising:
  comparing, by executing an instruction with at least one processor, first monitored media signatures associated with an advertisement block to a plurality of sequences of monitored media signatures associated with a first time period;
  determining, by executing an instruction with the at least one processor, a start boundary and an end boundary of a first advertisement in the advertisement block based on the comparison of the first monitored media signatures and the plurality of sequences of monitored media signatures, the first advertisement associated with second monitored media signatures representative of a subset of the first monitored media signatures between the start boundary and the end boundary;
  generating, by executing an instruction with the at least one processor, an entry in an advertisement relationship graph for the second monitored media signatures, the entry to map second monitored media signatures to the first advertisement; and
  crediting, by executing an instruction with the at least one processor, media exposure to the first advertisement based on the second monitored media signatures in the advertisement relationship graph.

15. The method of claim 14, wherein the first monitored media signatures are included in monitoring data reported by a media device meter, the media device meter to monitor media presented by a media device.

16. The method of claim 14, further including identifying the first advertisement by identifying a sequence of monitored media signatures included in the first monitored media signatures that is repeated in the plurality of sequences of monitored media signatures.

17. The method of claim 14, wherein the plurality of sequences of monitored media signatures are associated with a plurality of different broadcasts presented by a media device during the first time period.

18. The method of claim 17, further including determining the start boundary and the end boundary of the first advertisement by:

identifying a consecutive group of the first monitored media signatures that are repeated in the plurality of sequences of monitored media signatures;

determining the start boundary as a first one of the first monitored media signatures in the group; and determining the end boundary as a last one of the first monitored media signatures in the group.

19. The method of claim 14, further including determining a plurality of variations of boundaries of the first advertisement corresponding to variations of the first advertisement among different broadcasts, the plurality of variations of boundaries including a plurality of start boundaries and a plurality of end boundaries.

20. The method of claim 19, further including generating the advertisement relationship graph between the plurality of variations of boundaries of the first advertisement, the advertisement relationship graph to map signatures included in the plurality of variations of boundaries as representative of the first advertisement.

* * * * *